(12) United States Patent
Huang et al.

(10) Patent No.: US 12,087,242 B2
(45) Date of Patent: Sep. 10, 2024

(54) ELECTRONIC DEVICE

(71) Applicant: InnoLux Corporation, Miao-Li County (TW)

(72) Inventors: Yu-Chia Huang, Miao-Li County (TW); Yuan-Lin Wu, Miao-Li County (TW); Kuan-Feng Lee, Miao-Li County (TW); Tsung-Han Tsai, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 0 days.

(21) Appl. No.: 18/376,831

(22) Filed: Oct. 4, 2023

(65) Prior Publication Data

US 2024/0029666 A1 Jan. 25, 2024

Related U.S. Application Data

(63) Continuation of application No. 18/121,017, filed on Mar. 14, 2023, now Pat. No. 11,862,114, which is a
(Continued)

(30) Foreign Application Priority Data

Jun. 12, 2019 (CN) .......................... 201910506630.9

(51) Int. Cl.
*G09G 3/34* (2006.01)
*G02F 1/1333* (2006.01)
(Continued)

(52) U.S. Cl.
CPC ..... *G09G 3/3406* (2013.01); *G02F 1/133305* (2013.01); *G02F 1/133514* (2013.01); *G02F 1/1339* (2013.01); *G02F 1/134345* (2021.01); *G09G 5/10* (2013.01); *G02F 1/13363* (2013.01); *G02F 2201/56* (2013.01); *G02F 2202/36* (2013.01); *G02F 2413/01* (2013.01); *G09G 2320/0626* (2013.01); *G09G 2320/0666* (2013.01)

(58) Field of Classification Search
None
See application file for complete search history.

(56) References Cited

U.S. PATENT DOCUMENTS

2016/0349498 A1* 12/2016 Ma ....................... G02B 26/001
2018/0348512 A1* 12/2018 Chiba .................. G02B 3/0056
2021/0141266 A1*  5/2021 Takimoto .......... G02F 1/133512

* cited by examiner

*Primary Examiner* — Stephen T. Reed
(74) *Attorney, Agent, or Firm* — Winston Hsu

(57) ABSTRACT

An electronic device includes a display panel having a display surface. The display surface includes a first region and a second region arranged along a first direction. The display panel outputs a first light in the first region and a second light in the second region. The first light has a first normal brightness in a first orthogonal direction perpendicular to the first direction and a first oblique brightness in a first inclined direction. The first orthogonal direction and the first inclined direction form a first acute included angle. The second light has a second normal brightness in a second orthogonal direction and a second oblique brightness in a second inclined direction. The second orthogonal direction and the second inclined direction form a second acute included angle. The first oblique brightness and the second oblique brightness are different.

9 Claims, 19 Drawing Sheets

Related U.S. Application Data continuation of application No. 17/703,960, filed on Mar. 24, 2022, now Pat. No. 11,626,080, which is a continuation of application No. 16/889,718, filed on Jun. 1, 2020, now Pat. No. 11,308,894.

(51) Int. Cl.
*G02F 1/1335* (2006.01)
*G02F 1/13363* (2006.01)
*G02F 1/1339* (2006.01)
*G02F 1/1343* (2006.01)
*G09G 5/10* (2006.01)

ELECTRONIC DEVICE

CROSS REFERENCE TO RELATED APPLICATIONS

This application is a continuation application of U.S. application Ser. No. 18/121,017, filed on Mar. 14, 2023, which is a continuation application of U.S. application Ser. No. 17/703,960, filed on Mar. 24, 2022, which is a continuation application of U.S. application Ser. No. 16/889,718, filed on Jun. 1, 2020. The contents of these applications are incorporated herein by reference.

BACKGROUND OF THE DISCLOSURE

1. Field of the Disclosure

The present disclosure relates to a display device and a display panel and a manufacturing method thereof, and more particularly to a display device and a display panel and a manufacturing method thereof that have more uniform normal brightness in the normal view angle.

2. Description of the Prior Art

Recently, curved surface electronic devices have become one of the focuses of the new generation electronic technology. Therefore, the requirements for displays that can be integrated into the curved surface electronic devices also increases. However, after the traditional displays are bent into the curved surface shape, the internal or outputting light path will be changed, resulting in non-uniform brightness of the display surface. Therefore, the industry still needs to continue the research and development to produce the displays that can meet the requirements of the curved surface electronic devices.

SUMMARY OF THE DISCLOSURE

The present disclosure provides an electronic device including a display panel. The display panel includes a display surface. The display surface includes a first region and a second region arranged along a first direction, and the display panel outputs a first light in the first region and outputs a second light in the second region. The first light has a first normal brightness in a first orthogonal direction perpendicular to the first direction and a first oblique brightness in a first inclined direction. The first orthogonal direction and the first inclined direction form a first acute included angle. The second light has a second normal brightness in a second orthogonal direction and a second oblique brightness in a second inclined direction. The second orthogonal direction and the second inclined direction form a second acute included angle. The first oblique brightness and the second oblique brightness are different.

The present disclosure provides an electronic device including a display panel for displaying an image and including a display surface. The display surface of the display panel includes a first region and a second region arranged along a first direction. The display panel outputs a first light in the first region and outputs a second light in the second region. The first light has a first normal brightness in a first orthogonal direction perpendicular to the first direction and a first oblique brightness in a first inclined direction, a first included angle is between the first orthogonal direction and the first inclined direction, and the first included angle is greater than 0 degree and less than 90 degrees. The second light has a second normal brightness in a second orthogonal direction and a second oblique brightness in a second inclined direction, a second included angle is between the second orthogonal direction and the second inclined direction, and the second included angle is greater than 0 degree and less than 90 degrees. A ratio of a difference between the first normal brightness and the second normal brightness to the first normal brightness is defined as a first ratio, a ratio of a difference between the first oblique brightness and the second oblique brightness to the first oblique brightness is defined as a second ratio, and the first ratio is less than the second ratio.

The present disclosure further provides an electronic device including a display panel for displaying an image. The display panel includes a first substrate and a second substrate disposed on the first substrate. Each of the first substrate and the second substrate includes a curved surface. The second substrate includes a display surface, the display surface includes a first region with a first curvature and a second region with a second curvature different from the first curvature, and the display panel outputs a first light in the first region and outputs a second light in the second region. The first light has a first normal brightness in a normal view angle and a first oblique brightness in an oblique view angle, and the second light has a second normal brightness in the normal view angle and a second oblique brightness in the oblique view angle. A ratio of a difference between the first normal brightness and the second normal brightness to the first normal brightness is defined as a first ratio, a ratio of a difference between the first oblique brightness and the second oblique brightness to the first oblique brightness is defined as a second ratio, and the first ratio is less than the second ratio.

The present disclosure further provides a liquid crystal display. The liquid crystal display includes a backlight module and a display panel. The display panel includes a first region with a first curvature and a second region with a second curvature different from the first curvature. The display panel receives a light from the backlight module, outputs a first light in the first region and outputs a second light in the second region. The first light has a first normal brightness in a normal view angle and a first oblique brightness in an oblique view angle, and the second light has a second normal brightness in the normal view angle and a second oblique brightness in the oblique view angle. A ratio of a difference between the first normal brightness and the second normal brightness to the first normal brightness is defined as a first ratio, a ratio of a difference between the first oblique brightness and the second oblique brightness to the first oblique brightness is defined as a second ratio, and the first ratio is less than the second ratio.

The present disclosure further provides a display panel. The display panel includes a first region with a first curvature and a second region with a second curvature different from the first curvature. The display panel outputs a first light in the first region and outputs a second light in the second region. The first light has a first normal brightness in a normal view angle and a first oblique brightness in an oblique view angle, and the second light has a second normal brightness in the normal view angle and a second oblique brightness in the oblique view angle. A ratio of a difference between the first normal brightness and the second normal brightness to the first normal brightness is defined as a first ratio, a ratio of a difference between the first oblique brightness and the second oblique brightness to the first oblique brightness is defined as a second ratio, and the first ratio is less than the second ratio.

The present disclosure further provides a manufacturing method a display device. The method includes following steps: providing a display device, wherein the display device comprises a display panel; bending the display panel to make a first region of the display panel have a first curvature and a second region of the display panel have a second curvature, wherein the second curvature is different from the first curvature; performing brightness measurement to the display panel that has been bent to obtain an absolute value of a normal brightness difference between the first region and the second region; and performing a brightness adjustment procedure to reduce the absolute value of the normal brightness difference.

These and other objectives of the present disclosure will no doubt become obvious to those of ordinary skill in the art after reading the following detailed description of the embodiment that is illustrated in the various figures and drawings.

DETAILED DESCRIPTION

Figure 1:
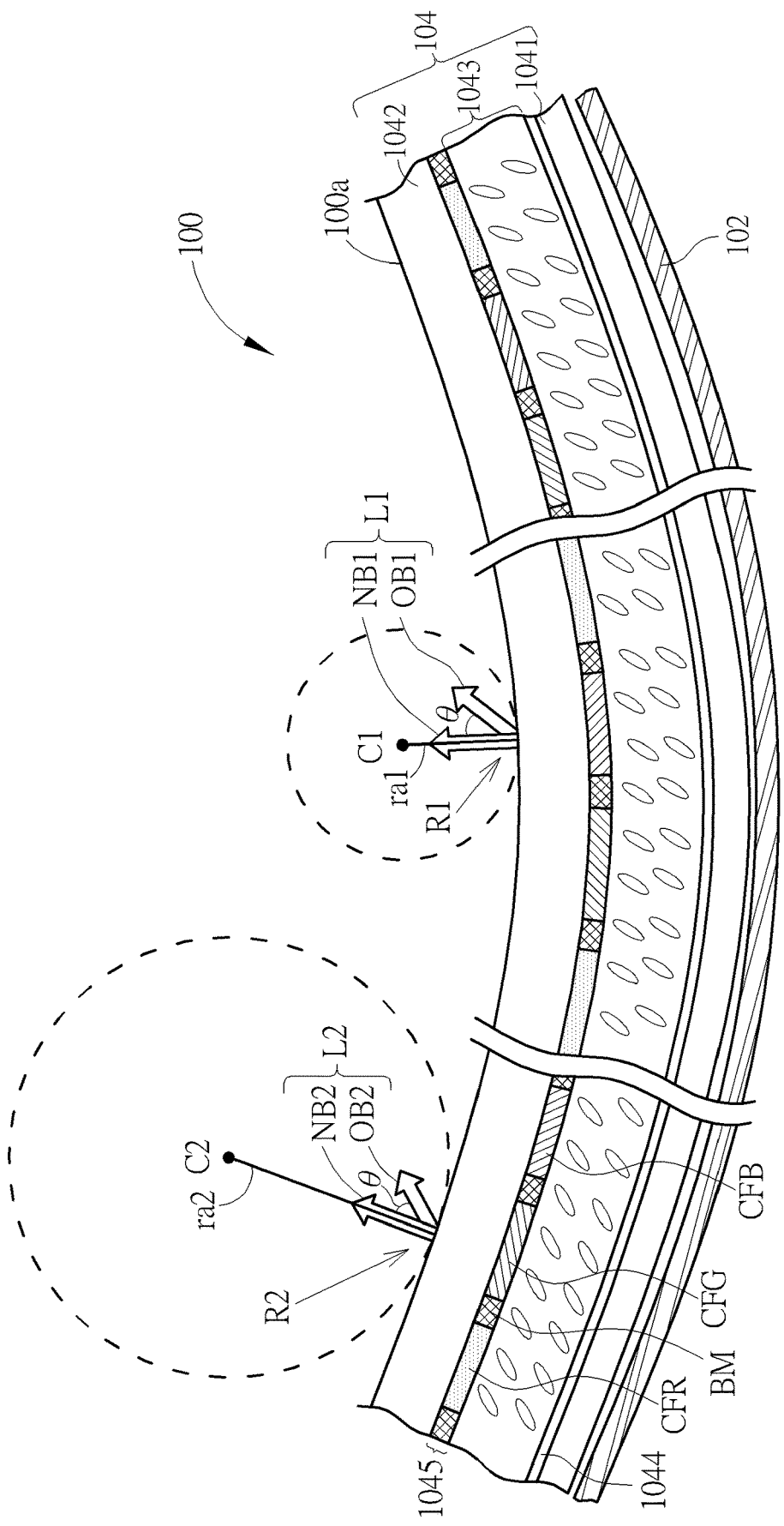
FIG. 1 is a partial sectional-view schematic diagram of a display device according to the present disclosure.

The present disclosure may be understood by reference to the following detailed description, taken in conjunction with the drawings as described below. It is noted that, for purposes of illustrative clarity and being easily understood by the readers, various drawings of this disclosure show a portion of the display device, and certain elements in various drawings may not be drawn to scale. In addition, the number and dimension of each element shown in drawings are only illustrative and are not intended to limit the scope of the present disclosure.

Certain terms are used throughout the description and following claims to refer to particular components. As one skilled in the art will understand, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . "

When the corresponding component such as a layer or a region is referred to "on another component (or the variant thereof)" or "extend to another component", it may be directly on another component or directly extend to another component, or other components may be presented between them. On the other hand, when the component is referred to "directly on another component (or the variant thereof)" or "directly extend to another component", there are no components presented between them. In addition, when the component is referred to "be coupled to/with another component (or the variant thereof)", it may be directly connected to the other component, or it may be indirectly connected (such as electrically connected) to the other component through other component or components.

It should be understood that when an element or layer is referred to as being "on" or "connected to" another element or layer, it may be directly on or directly connected to the other element or layer, or intervening elements or layers may be presented. In contrast, when an element is referred to as being "directly on" or "directly connected to" another element or layer, there are no intervening elements or layers presented.

When the terms "include", "comprise" and/or "have" are used in the description of the present disclosure, the corresponding features, regions, steps, operations and/or components would be pointed to existence, but not limited to the existence of one or more corresponding features, regions, steps, operations and/or components.

The display device of the present disclosure may be applied to electronic devices of display equipment or tiled devices, but not limited thereto. The tiled devices may be, for example, display tiled devices or tiled with other devices such as antenna devices and sensing devices, but not limited thereto.

The display device of the present disclosure may be a curved surface display device or a bendable display device.

A bendable display device means the device can be curved, bent, folded, stretched, flexed, or the like (generally referred to as "bendable" hereinafter). That is to say, the display device may have a curved surface or present a bent state when operating, and the display device may have a fixed curved surface shape or have different curved states according to usage requirements.

The embodiments of the display device of the present disclosure may be: a liquid crystal display (LCD) that is non-self-emitting, an organic light emitting diode display (OLED display), an inorganic light emitting diode display (LED display), a mini-LED display, a micro-LED Display, a quantum-dot LED display (QLED display) or an electrophoretic display (EPD) that are self-emitting, and other display devices that can display images and pictures, but not limited thereto.

It should be noted that the technical features in different embodiments described in the following can be replaced, recombined, or mixed with one another to constitute another embodiment without departing from the spirit of the present disclosure.

Please refer to FIG. 1. FIG. 1 is a partial sectional-view schematic diagram of an embodiment of a display device according to the present disclosure. This embodiment is an embodiment of a liquid crystal display. In this embodiment, the display device 100 includes a display panel 104 that is non-self-emitting, that is, a liquid crystal display panel, so the display device 100 can include a backlight module 102. In other embodiments, the display device 100 may include a display panel 104 that is self-emitting, and the display device 100 may not include the backlight module 102 because the display panel 104 itself has dual functions of light emitting and display. In this embodiment, the backlight module 102 may produce incident light L0, which is used as a backlight required by the display panel 104 for displaying images. The backlight module 102 may include various suitable light emitting elements, such as various kinds of light emitting diodes (LEDs) or cold cathode fluorescent lamps (CCFLs). The types of the light emitting diodes can include: inorganic light emitting diodes (inorganic LEDs), mini-LEDs, micro-LEDs, organic light emitting diodes (OLEDs) or quantum dot light emitting diodes (QLEDs), but not limited thereto. The display panel 104 has a first substrate 1041, a second substrate 1042 and a liquid crystal layer 1043. The first substrate 1041 is disposed on a side of the display panel 104 that is closer to the backlight module 102. The liquid crystal layer 1043 is disposed between the first substrate 1041 and the second substrate 1042 and surrounded and sealed between the two substrates by a sealant, so as to be used for modulating the incident light from the backlight module 102. The first substrate 1041 and the second substrate 1042 may be respectively a thin glass substrate or a substrate including organic polymer materials that are bendable, such as a polyethylene terephthalate (PET) substrate, a polyimide (PI) substrate or a polyethylene naphthalate (PEN) substrate, but not limited thereto. In this embodiment, the outer surface of the second substrate 1042 may be used as a display surface 100a of the display panel 104. In other embodiments, the outer surface of the first substrate 1041 may be independently used as a display surface of the display panel 104, or the display panel 104 may have two display surfaces which are the outer surface of the second substrate 1042 and the outer surface of the first substrate 1041. In this embodiment, the display panel 104 may further include an array circuit layer 1044 disposed on the inner surface of the first substrate 1041 and a color filter layer 1045 disposed on the inner surface of the second substrate 1042. In other embodiments, the array circuit layer 1044 may also be disposed on the inner surface of the second substrate 1042, the color filter layer 1045 may also be disposed on the inner surface of the first substrate 1041 alternatively, or the display panel 104 does not include the color filter layer 1045. The array circuit layer 1044 may include multiple-layers of conductive layers, insulating layers, and/or a semiconductor layer to construct, for example, switching elements (e.g., thin film transistors, TFTs), electronic elements such as capacitors, wires or circuits, etc. In this embodiment, the color filter layer 1045 may include red color filters CFR, green color filters CFG and blue color filters CFB, which are arranged side by side along the direction D1, and a light shielding layer (or referred to a black matrix layer) BM may be disposed between the red filter CFR, the green filter CFG and the blue filter CFB that are adjacent. In other embodiments, the color filter layer 1045 may include a red quantum-dot color converting layer and a green quantum-dot color converting layer (when the incident light L0 of the backlight module 102 is blue light), or the color filter layer 1045 may include a red quantum-dot color converting layer, a green quantum-dot color converting layer and a blue quantum-dot color converting layer (when the incident light L0 of the backlight module 102 is ultraviolet light) or may include fluorescence materials, phosphor materials or other suitable materials, and the materials thereof may be provided in any arrangement or combination, but not limited thereto. The display panel 104 may further include spacers (not shown in FIG. 1) disposed on the first substrate 1041 or the second substrate 1042, that is, disposed between the first substrate 1041 or the second substrate 1042, in order to support the gap distance of the liquid crystal layer 1043. The spacers may be columnar, wall-shaped or granular and arranged between the two substrates in a uniform or non-uniform type. In addition, various functional films (not shown in FIG. 1) may be selectively attached to the outer surface of the first substrate 1041 or the outer surface of the second substrate 1042, and such functional film may be, for example, a polarizer film, a retarder film, an anti-reflective film, a privacy protection film, an anti-scattering film, an anti-static shielding film or a protective film, but not limited thereto.

The display surface 100a (attached with a functional film) of the display panel 104 includes a first region R1 with a first curvature and a second region R2 with a second curvature, and the second curvature is different from the first curvature. The curvature of portions within each region (R1 or R2) is approximately identical, and the area of each region (R1 or R2) may be greater than 0 and less than 100 square centimeters ($cm^2$). The curvature is used to describe a curved extent of the geometry. The curvature of a certain point or a certain tiny region on the geometry may be a reciprocal of a curvature radius of its osculating circle. For example, in a straight line, the curvature radius of the osculating circle at any point or any tiny region (which is a region with an area approaching 0 in mathematical calculation, and may be a region within a tolerance range of the curvature measuring apparatus in practice) is infinite, and the curvature thereof is 0. Furthermore, for example, in a curved line, the curvature radius of the osculating circle at any point or any tiny region is R, the curvature thereof is 1/R, and the center of the osculating circle is referred to the curvature center. In practice, the curvature radius of the surface of the geometry may be measured by using apparatus such as a spherometer or an optical interferometer. As shown in FIG. 1, the first curvature has a curvature center C1, and the curvature radius of the first curvature is represented as a first radius ra1. The second curvature has a curvature center C2, and the curvature radius of the second curvature is represented as a second radius ra2. The first radius ra1 is different from the second radius ra2, and an absolute value of a difference between the first radius ra1 of the first curvature and the second radius ra2 of the second curvature may be greater than 10 millimeters (mm) (>10 mm). When the first region R1 is a plane (a straight line) and the second region R2 is a curved surface (a curved line), the first radius ra1 is infinite, and the second radius ra2 is finite, so the absolute value of the difference between the first radius ra1 and the second radius ra2 is infinite, and thus a range of the absolute value of the difference between the first radius ra1 and the second radius ra2 is greater than 10 mm and less than infinity. According to some embodiments, the curvature center C1 and curvature center C2 are disposed on the same side of the display surface 100a, but not limited thereto. In some embodiments, the curvature center C1 of the first region R1 and the curvature center C2 of the second region R2 may be disposed on different sides of the display surface 100a. In some embodiments, the first radius ra1 may be greater than the second radius ra2. In another embodiment, the first radius ra1 may be less than the second radius ra2. FIG. 1 shows that the first radius ra1 is smaller than the second radius ra2 as an example. In this embodiment, after the incident light L0 emitted from the backlight module passes through the display panel 104, a first light L1 (also referred to as a first exiting light L1) is outputted from the first region R1 on the display surface 100a (including a functional film attached to the display surface 100a) of the display panel 104, and a second light L2 (also referred to as a second exiting light L2) is outputted in the second region R2 on the display surface 100a of the display panel 104. In other embodiments, the display device 100 has no backlight module 102, and the display panel 104 is a self-emitting display panel. A first exiting light L1 is directly outputted in the first region R1 on the display panel 104, and a second exiting light L2 is directly outputted in the second region R2 on the display panel 104. The first exiting light L1 has a first normal brightness in a normal view angle and a first oblique brightness in a specific oblique view angle. In FIG. 1, the first normal brightness and the first oblique brightness are respectively represented by an arrow NB1 and an arrow OB1. Regarding a tiny partial region (which is a region with an area approaching 0 in mathematical calculation, and may be a region within a tolerance range of the curvature measuring apparatus in practice) as a plane, the normal direction of this plane is referred to a direction of the normal view angle, and a direction of the oblique view angle is a direction having an included angle of greater than 0 degree (>0°) and less than 90 degrees (<90°) with respect to the direction of the normal view angle in such partial region. In this partial region, there is one direction of the normal view angle and a plurality of directions of the oblique view angles. In this embodiment, a range of an acute included angle θ between the direction of the oblique view angle and the direction of the normal view angle is greater than or equal to 20 degrees (≥20°) and less than or equal to 60 degrees (≤60°). In other embodiments, a range of an acute included angle θ between the direction of the oblique view angle and the direction of the normal view angle is greater than 0 degree (>0°) and less than or equal to 20 degrees (≤20°), or greater than or equal to 60 degrees (≥60°) and less than 90 degrees (<90°). In addition, the brightness represents the integral value of the intensity in the visible light wavelength range of the emission spectrum, the visible light wavelength range may range from 380 nanometers (nm) to 780 nanometers (nm), and the intensity may be absolute intensity or normalized intensity. The calculation exemplified in the present disclosure may all use absolute intensity or normalized intensity. In practice, various spectrometers or photometers may be used in combination with axial adjustment mechanisms or multi-angle probes, such that the measurement axis may be adjusted, the spectrum of the normal view angle (normal direction) or the oblique view angle (not normal direction) of the light-emitting surface of the object may be measured, and converted into the brightness. On the other hand, the second exiting light L2 has a second normal brightness in the normal view angle and a second oblique brightness in the same oblique view angle described above. In FIG. 1, the second normal brightness and the second oblique brightness are respectively represented by an arrow NB2 and an arrow OB2. According to this embodiment, an absolute value of a difference between the first normal brightness NB1 and the second normal brightness NB2 is defined as an absolute value of a first difference, and a ratio of the absolute value of the first difference to the first normal brightness NB1 is defined as a first ratio r1, that is, r1=(|NB1−NB2|)/NB1. An absolute value of a difference between the first oblique brightness OB1 and the second oblique brightness OB2 is defined as an absolute value of a second difference, and a ratio of the absolute value of the second difference to the first oblique brightness OB1 is defined as a second ratio r2, that is, r2=(|OB1−OB2|)/OB1. Furthermore, in the display device 100 of the present disclosure, the first ratio r1 is less than the second ratio r2 (r1<r2). The first ratio r1 is calculated from the absolute value of the difference between the first normal brightness NB1 and the second normal brightness NB2 (i.e., the absolute value of the first difference). The second ratio r2 is calculated from the absolute value of the difference between the first oblique brightness OB1 and the second oblique brightness OB2 (i.e., the absolute value of the second difference). According to some embodiments of the present disclosure, a ratio of the first ratio r1 to the second ratio r2 (r1/r2) is greater than or equal to 0.1 and less than 1.0 (0.1≤r1/r2<1.0). The above-mentioned first ratio r1 may be regarded as a brightness difference ratio between the first region R1 and the second region R2 in the normal view angle (also called as a normal brightness difference ratio between the first region R1 and the second region R2) of the display device 100, and the second ratio r2 may be regarded as a brightness difference ratio between the first region R1 and the second region R2 in the specific oblique view angle (also called as an oblique brightness difference ratio between the first region R1 and the second region R2) of the display device 100.

The brightness of each region in each view angle may be obtained by various spectrometers or photometers in combination with axial adjustment mechanisms or multi-angle probes. Furthermore, the measurement of each brightness may be based on the light with a wavelength of 550 nm or 555 nm. The light with the wavelength of 550 nm or 555 nm is generally the wavelength value at the position of the main light intensity peak of green light. Human eyes are more sensitive to the green light (stimulation value is higher than from the red light and the blue light). According to some embodiments, it is designed that in the green light waveband, the light generated in different regions has a smaller difference in the direction of the normal view angle (which is compared with the red light waveband and the blue light waveband), so as to improve the optical performance, that is, the users in the direction of the normal view angle may perceive smaller optical brightness difference.

Figure 2:
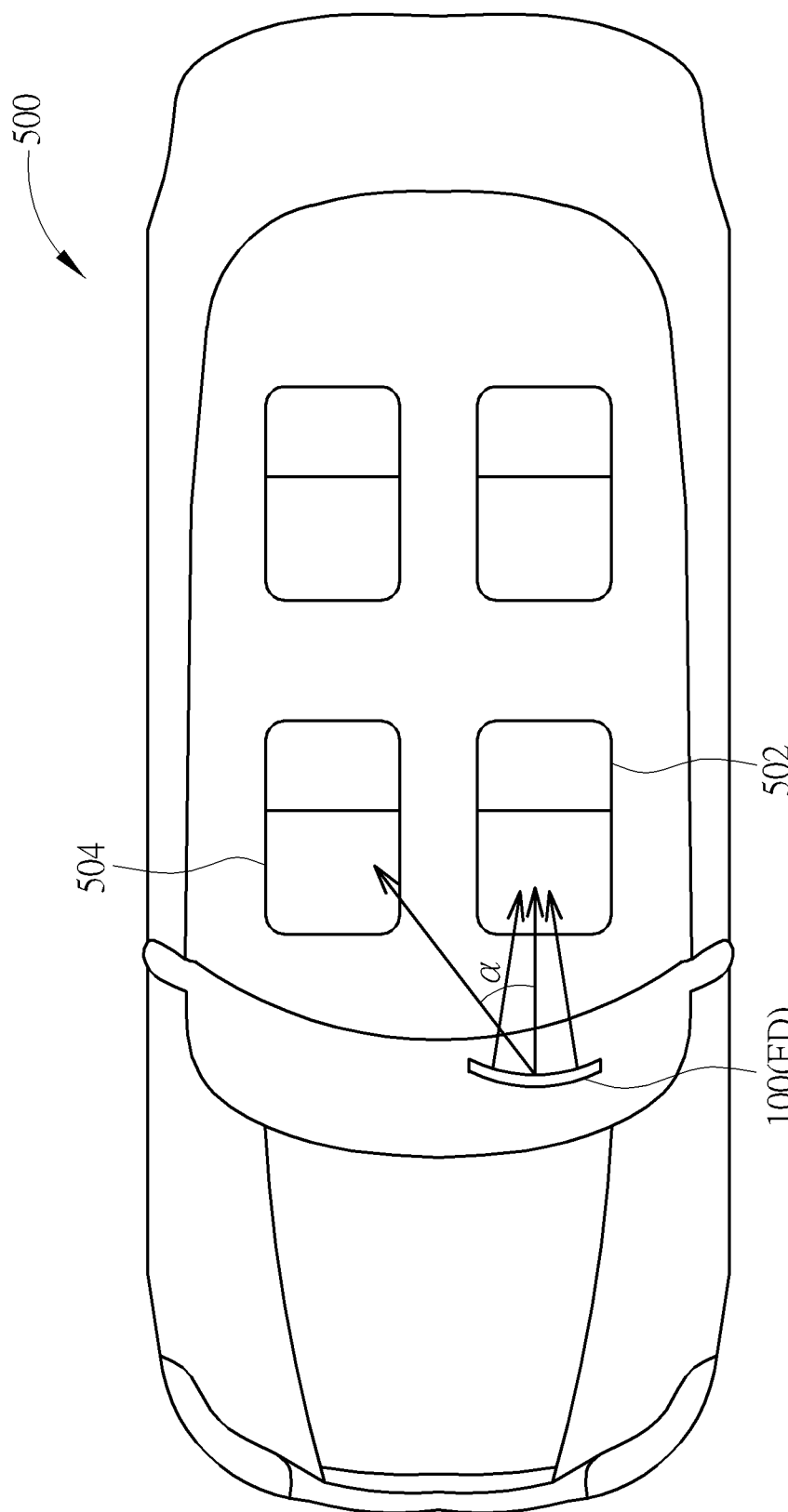
FIG. 2 is a schematic diagram of a display device applied to a vehicle electronic device according to the present disclosure.

In the above-mentioned design, the brightness difference value or brightness difference ratio between the first region R1 and the second region R2 in a normal view angle can be less than the brightness difference value or brightness difference ratio between the first region R1 and the second region R2 in an oblique view angle, such that the images perceived by the users in the direction of the normal view angle have more consistent brightness, that is, better brightness uniformity. The brightness uniformity of the images viewed from the direction of the normal view angle may be higher than that of the images viewed from the direction of the oblique view angle. Please refer to FIG. 2. FIG. 2 is a schematic diagram of a display device applied to a vehicle electronic device according to the present disclosure. For example, the display device 100 of the present disclosure may be used as a display device in a vehicle electronic device ED of a vehicle 500, such as an instrument cluster display (ICD), a center stack display (CID), a rear seat entertainment display (RSED), or a rearview mirror display (RMD), etc. When the vehicle electronic device ED is used as an instrument cluster display (ICD) for providing the driver with driving related information, it is generally disposed at a position closer to the driver, such as disposed directly in front of the driver seat 502 (as shown in FIG. 2) or disposed obliquely in front of the driving seat 502, and a maximum viewable angle range a in the vehicle is about 60 degrees, that is, the maximum angle viewed from the co-driver seat 504. The main user of the vehicle electronic device ED is the driver, according to some embodiments, the display device 100 of the present disclosure may provide display images with more uniform brightness in the direction of the normal view angle, so the driver can obtain clear image information more likely. In other words, the accuracy of the image in the normal view angle viewed by the driver will be higher than the accuracy of the image in the oblique view angle viewed by the co-driver. When the display device 100 is disposed in, for example, a vehicle 500 or other specific application sites, each region of the display surface 100a of the display device may have different curvatures according the requirement of the arrangement position. For example, the curvature of each region may meet the requirement of the vehicle body. According to some embodiments, in the display device 100, the accuracy in the normal view angle of can be higher than the accuracy in the oblique view angle. That is, brightness uniformity in the normal view angle for each curvature and region can be adjusted. The position of the main user corresponding to the vehicle display device is fixed, so the optimized adjustment may be performed for the display in a specific view angle.

Furthermore, in the display device 100 of some embodiments of the present disclosure, an absolute value of a difference between a chromaticity of the first exiting light L1 in the normal view angle and a chromaticity of the second exiting light L2 in the normal view angle is defined as an absolute value of a first chromaticity coordinate difference, and an absolute value of a difference between a chromaticity of the first exiting light L1 in the oblique view angle and a chromaticity of the second exiting light L2 in the oblique view angle is defined as an absolute value of a second chromaticity coordinate difference. The absolute value of first chromaticity coordinate difference as mentioned above can be less than the absolute value of the second chromaticity coordinate difference as mentioned above. For example, but not limited, in the specification of a CIE xy chromaticity diagram of the CIE 1931 XYZ color space (taking x and y color coordinate values as indexes of chromaticity), the absolute value of the first chromaticity coordinate difference (such as an absolute value of a difference of x, or an absolute value of a difference of y) is greater than 0 and less than or equal to three thousandths (≤0.003). The absolute value of the second chromaticity coordinate difference (such as an absolute value of a difference of x, or an absolute value of a difference of y) is greater than 0 and less than or equal to ten thousandths (≤0.01), but is still larger than the first chromaticity coordinate difference. In practice, to obtain the chromaticity, various spectrometers or colorimeters may be used in combination with axial adjustment mechanisms or multi-angle probes, such that the measurement axis may be adjusted. The spectrum of light from the output surface of the object in the normal view angle (normal direction) or the oblique view angle (not normal direction) may be measured, and converted into the chromaticity coordinate value. On the other hand, in some embodiments, the spectrum or composition of each color light of the first exiting light L1 and the second exiting light L2 may not be completely the same. For example, the waveband brightness (the integration of light intensity in certain waveband) of the first exiting light L1 in a wavelength range of 500 nanometers (nm) to 570 nanometers (nm) may be different from the waveband brightness of the second exiting light L2 in the wavelength range of 500 nanometers (nm) to 570 nanometers (nm), that is, the waveband brightness of the first exiting light L1 and the second exiting light L2 in about the green waveband may be different. Further, for example, the waveband brightness of the first exiting light L1 in the wavelength range of 450 nanometers (nm) to 500 nanometers (nm) may be different from the waveband brightness of the second exiting light L2 in the wavelength range of 450 nanometers (nm) to 500 nanometers (nm), that is, the waveband brightness of the first exiting light L1 and the second exiting light L2 in about the blue waveband may be different. As mentioned above, by adjusting the green waveband brightness or the blue waveband brightness of the first exiting light L1 and the second exiting light L2, the users may receive more uniform brightness according to the perception extent of human eyes to different color lights.

Figure 3:
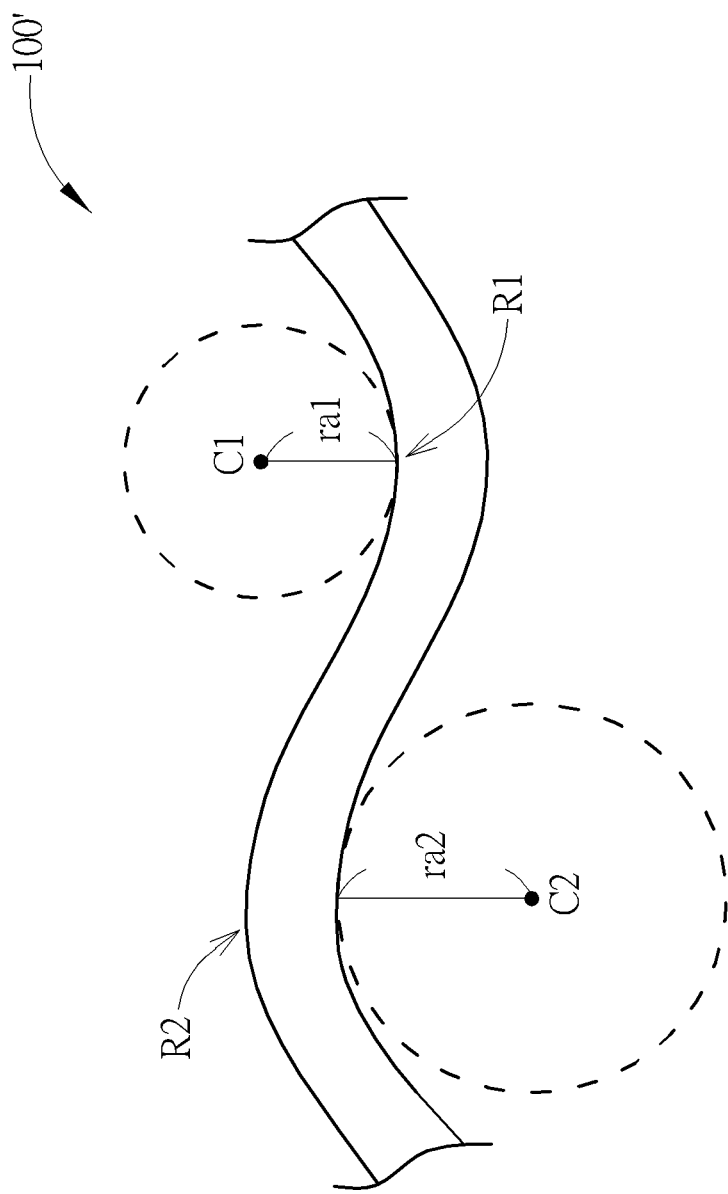
FIG. 3 is a sectional-view schematic diagram of an embodiment of a display device according to the present disclosure.

Please refer to FIG. 3. FIG. 3 is a sectional-view schematic diagram of another embodiment of a display device according to the present disclosure. The display device 100' in this embodiment has a first curvature in a first region R1 and a second curvature in a second region R2 respectively, and a curvature center C1 of the first curvature and a curvature center C2 of the second curvature are respectively disposed on different sides of the display device 100'. The curvature radius of the first curvature is represented as a first radius ra1, and the curvature radius of the second curvature is represented as a second radius ra2. The first radius ra1 is different from the second radius ra2. For example, the first radius ra1 is less than the second radius ra2, but not limited thereto. The relative brightness relationship between the exiting light in the first region R1 and the second region R2 may be referred to the previous embodiment, and will not be described herein. The features in different embodiments can be mixed or combined with one another without departing from or violating the spirit of the present disclosure.

Figure 4:
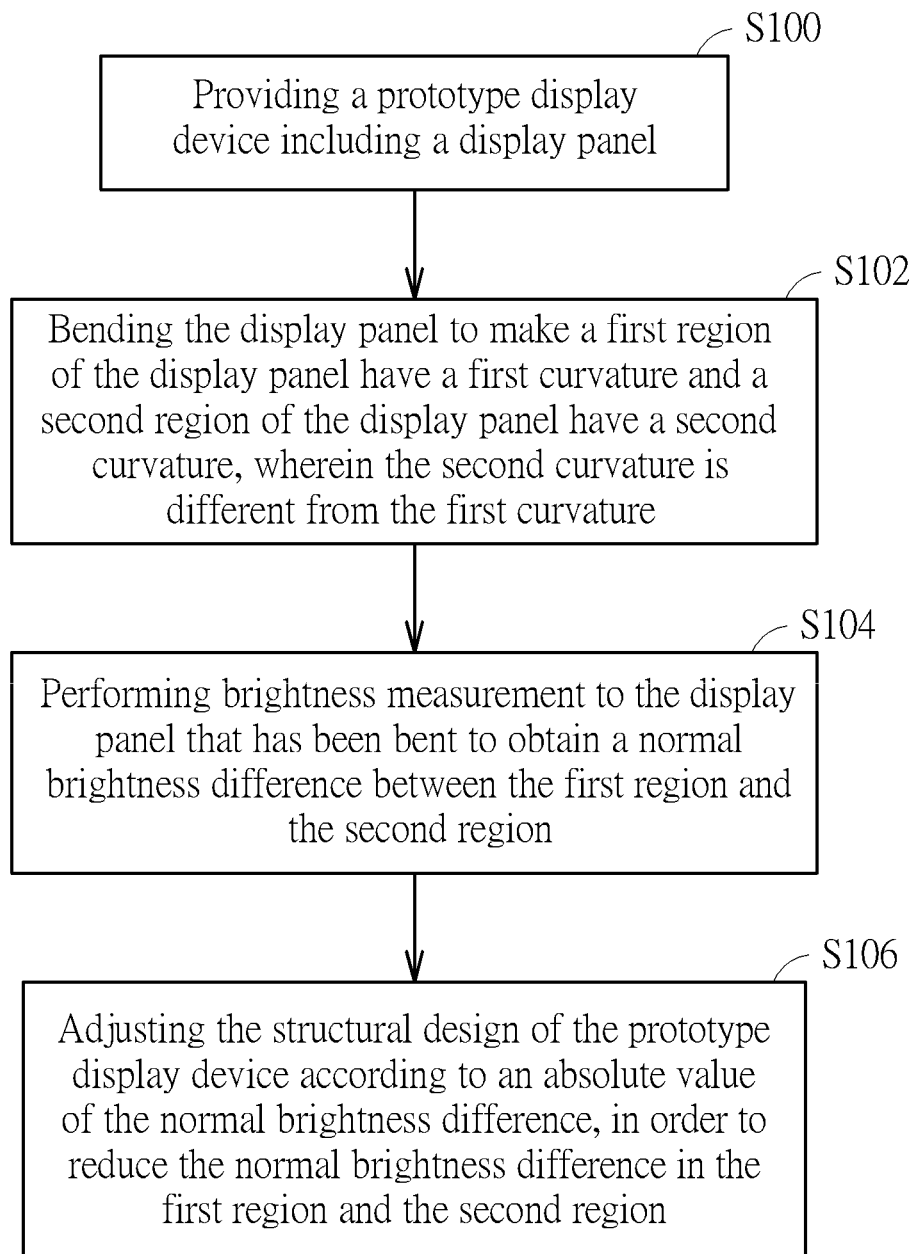
FIG. 4 is a flowchart of an embodiment of a design method of a display device according to the present disclosure.
Figure 5:
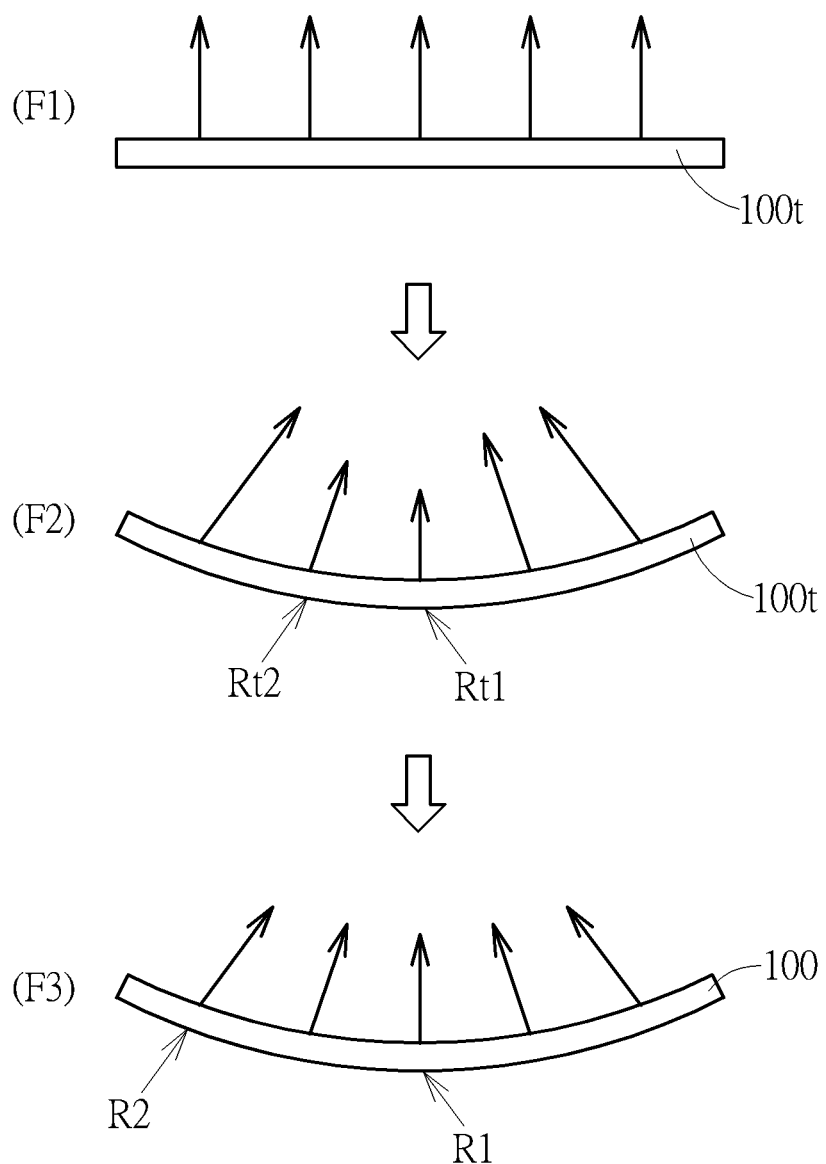
FIG. 5 is a manufacturing process schematic diagram of the method shown in FIG. 4.

Please refer to FIG. 4 and FIG. 5. FIG. 4 is a flowchart of an embodiment of a design method of a display device according to the present disclosure. FIG. 5 is a manufacturing process schematic diagram of the method shown in FIG. 4. The manufacturing method of the display device provides a design method of the display device, which comprises the following steps:

Step S100: Providing a prototype display device 100t. The structure of the prototype display device 100t may be similar to the display device 100 shown in FIG. 1, and the prototype display device 100t includes a display panel having a liquid crystal layer. The prototype display device 100t may also be other types of displays. In an initial state, the prototype display device 100t has a display surface of a plate shape, and the exiting light type in each region on the display surface is generally uniform, as shown in a flow (F1) of FIG. 5.

Step S102: Bending the display panel, for example, bending it according to the predetermined curved surface state of the product, to make a first region Rt1 of the display panel have a first curvature and a second region Rt2 of the display panel have a second curvature. The second curvature is different from the first curvature.

In a bent state, since the curvatures of different regions of the display panel are different, the incident light from the backlight module can have different light paths in the liquid crystal layer, or the emitting directions of the light emitting sources of the display panel itself may be different. Thus, the display panel can have different exiting light types in different regions, and the light can have different brightness or chromaticity in different angles, as shown in a flow (F2) of FIG. 5.

Step S104: Performing brightness or chromaticity measurement in each angle to the display panel that has been bent to obtain an absolute value of a normal brightness difference between the first region Rt1 and the second region Rt2.

Step S106: Adjusting the structural design of the display device according to the absolute value of the normal brightness difference to obtain a display device 100 with better optical effect, as shown in a flow (F3) of FIG. 5. The adjustment method thereof is reducing the absolute value of the normal brightness difference. Relevant structures about the first region R1 and the second region R2 of the display device 100, such as the absolute value of the normal brightness difference and the curvature definition may be referred to the relevant description of FIG. 1.

From the above description, the manufacturing method includes bending the prototype display device 100t into the predetermined curved surface shape, realizing the exiting light brightness of different regions of the display panel after bending, especially the light brightness of the normal view angle, and then adjusting the structural design of the display device to improve the uniformity of the normal brightness. In another embodiment, the step S104 may further include measuring the oblique brightness of different regions of the display panel, and comparing the oblique brightness difference in each region, or measuring the normal chromaticity and the oblique brightness of different regions and mainly reduce the normal chromaticity difference. It should be noted that, the present disclosure focuses on making the normal brightness (or chromaticity) of each region tend to be uniform, more than the uniform condition of the oblique brightness (or chromaticity). Therefore, in order to reduce the absolute value of the normal brightness difference (or the absolute value of the color coordinate difference) of different regions, it is likely to make various structural or operational special designs for the display 100. In such design, the absolute value of the normal brightness difference (or the absolute value of the color coordinate difference) in the first region R1 and the second region R2 of the display panel of the display device 100 should be smaller the absolute value of the normal brightness difference (or the absolute value of the color coordinate difference) in the first region Rt1 and the second region Rt2 of the prototype display device 100t. In different embodiments, the absolute value of the oblique brightness difference in the first region R1 and the second region R2 of the display panel of the display device 100 may be larger than, less than or equal to the absolute value of the oblique brightness difference in the first region Rt1 and the second region Rt2 of the prototype display device 100t. That is to say, when manufacturing the display device 100, the principle is mainly to reduce the absolute value of the normal brightness difference (or the absolute value of the color coordinate difference) between different regions of the display panel, and the absolute value of the oblique brightness difference (or the absolute value of the color coordinate difference) may also be selectively reduced. If it may not be both achieved, the objective is to reduce the absolute value of the normal brightness difference (or the absolute value of the color coordinate difference) between different regions first. The normal brightness differences or the color coordinate differences mentioned above are all compared with each other in absolute values.

The structural parameters for adjusting brightness uniformity may include, but not limited to, backlight source brightness, inclined angle of transparent electrodes of sub-pixels, groove design of the optical compensation film, pattern design and aperture ratio of the light shielding layer, distribution density and sizes of the spacers, aperture ratio of each color sub-pixel, thickness of color filters of different colors, thickness of the liquid crystal layer, etc. In addition, according to the present disclosure, in the step S100, the provided prototype display device 100t may also, according to the later predetermined bent shape, be designed differently for different regions by using one or more structural parameters mentioned above in advance, so as to perform pre-compensation design inside the display device. For example, by designing different thicknesses of the liquid crystal layer in different regions of the display panel, the traveling path lengths of the light in the liquid crystal layer are more uniform after bending, but not limited thereto.

Figure 6:
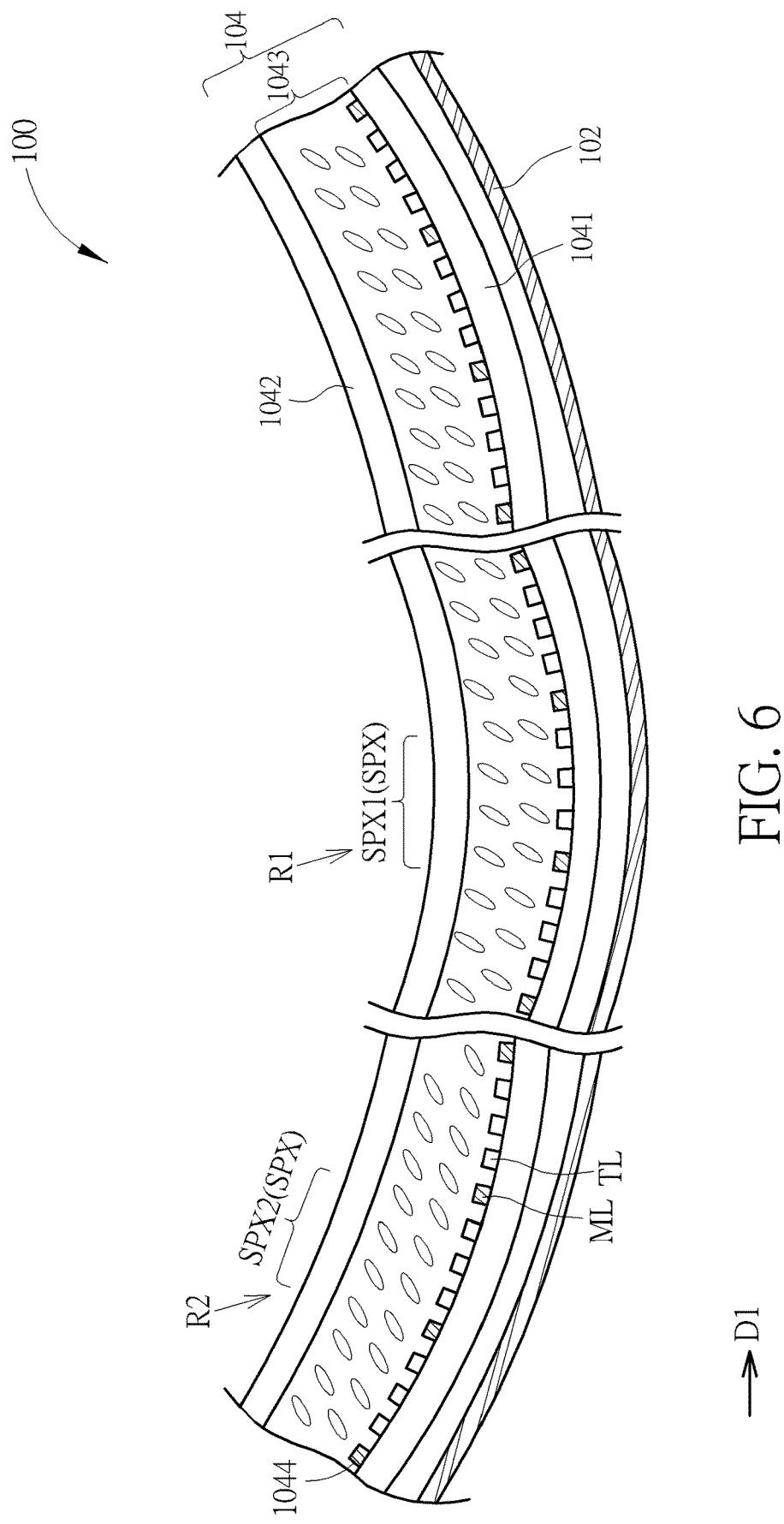
FIG. 6 is a sectional-view schematic diagram of another embodiment of a display device according to the present disclosure.
Figure 7:
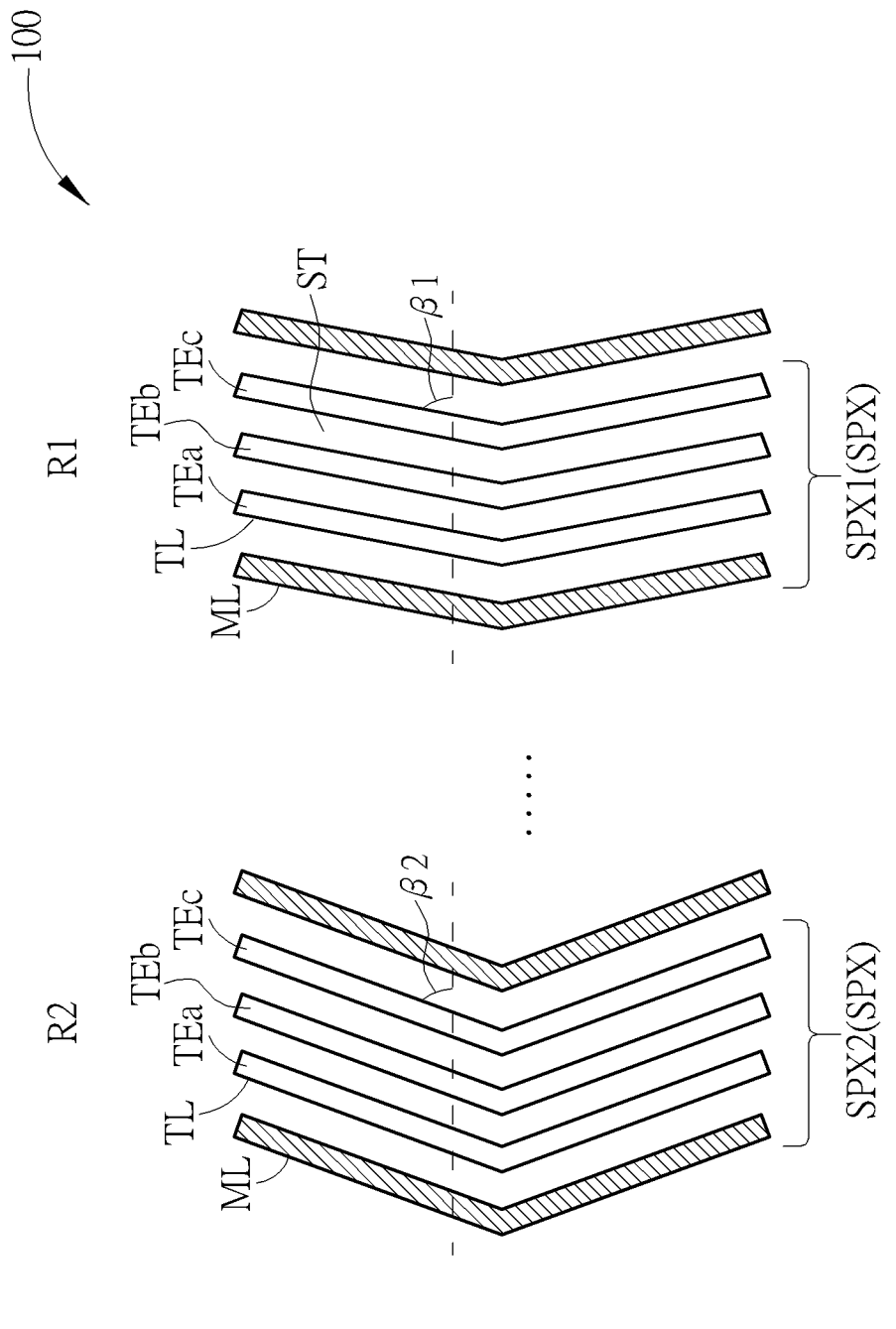
FIG. 7 is a partial enlargement top-view schematic diagram of a circuit array layer of the display device shown in FIG. 6.

Please refer to FIG. 6 and FIG. 7. FIG. 6 is a sectional-view schematic diagram of another embodiment of a display device according to the present disclosure. FIG. 7 is a partial enlargement top-view schematic diagram of a circuit array layer of the display device shown in FIG. 6. FIG. 6 only illustrates a part of the elements of the circuit array layer 1044, and the color filter layer 1045, the light shielding layer BM and other elements of the display device are omitted. As shown in FIG. 6 and FIG. 7, each of the sub-pixels SPX of the display device 100 includes a metal conductive layer ML and a transparent conductive layer TL, respectively. The metal conductive layer ML shown in FIG. 7 may be a data line (which may also be a gate line, a common electrode line or a power line), and the transparent conductive layer TL shown in FIG. 7 may be a transparent electrode of the sub-pixel SPX, such as a pixel electrode and/or a common electrode. For example, one sub-pixel SPX may include a plurality of transparent electrodes TEa, TEb and TEc, and when the transparent electrodes TEa, TEb and TEc are all used as pixel electrodes, the transparent electrodes TEa, TEb and TEc may be electrically connected with each other or directly connected with each other. For example, they may be connected with each other at the upper end or the lower end thereof by a part of the transparent conductive layer TL, and there are slits ST between the transparent electrodes TEa, TEb and TEc. If one of the transparent electrodes TEa, TEb and TEc is used as a common electrode, then the transparent electrode TEa, TEb or TEc used as the common electrode will not be connected with the transparent electrode TEa, TEb or TEc used as the pixel electrode. According to this embodiment, each of the transparent electrodes TEa, TEb and TEc has a shape of "<", and the transparent electrodes TEa, TEb and TEc are adjacent and side by side along the direction D1, but not limited thereto. In other embodiments, the transparent electrodes TEa, TEb and TEc may have different shapes, such as a shape of "/", a shape of "J" or a shape of "S". The direction D1 may be any one of the principal axes of a Cartesian coordinate system (also known as an orthogonal coordinate system or an xyz coordinate system, and the three principal axes are orthogonal to each other), such as the x axis, the y axis, or the z axis. The transparent electrodes TEa, TEb and TEc in the sub-pixel SPX1 corresponding to the first region R1 have a pixel included angle β1 with respect to the direction D1, and the transparent electrodes TEa, TEb and TEc in the sub-pixel SPX1 corresponding to the second region R2 have a pixel included angle β2 with respect to the direction D1.

In the step S106 of FIG. 4, the structural design of the display device 100 is adjusted, in order to reduce the normal brightness difference in the first region R1 and the second region R2. In this embodiment, it is designed to make the pixel included angle β2 different from the pixel included angle β1, that is, make the slits ST between the transparent electrodes TEa, TEb and TEc have different inclined angles in the first region R1 and in the second region R2, so as to achieve the objective of making the normal brightness more uniform. In some embodiments, the angle difference between the pixel included angle β2 and the pixel included angle β1 may be greater than 3 degrees (>3°) and less than 30 degrees (<30°), but not limited thereto. The angle difference between the pixel included angle β2 and the pixel included angle β1 may also be greater than 3 degrees (>3°) and less than 10 degrees (<10°). For example, when performing brightness measurement to the prototype display device 100t that has been bent in the step S104 of FIG. 4, if the normal brightness of the first region Rt1 is less than the normal brightness of the second region Rt2, the pixel included angle β1 of the sub-pixel SPX1 in the first region R1 of the display device 100 may be designed as greater than the pixel included angle β2 of the sub-pixel SPX2 in the first region R2 of the display device 100, that is, making the angle between the silts ST and the direction D1 closer to 90 degrees. When the pixel included angle β1 is greater, the transmittance of the light to the liquid crystal layer 1043 is higher, so the brightness of the sub-pixel SPX1 may be enhanced, such that the brightness of the sub-pixel SPX1 in the first region R1 is closer to the brightness of the sub-pixel SPX2 in the second region R2. If the measured result in the step S104 is opposite to the above-mentioned example, the pixel included angle β1 of the sub-pixel SPX1 and the pixel included angle β2 of the sub-pixel SPX2 may have opposite designs, and will not be described herein. In this embodiment, by adjusting the pixel included angle β1 and the pixel included angle β2, the above-mentioned first ratio r1 can be less than the above-mentioned second ratio r2, or the ratio of the first ratio r1 to the second ratio r2 (r1/r2) can be greater than or equal to 0.1 and less than 1.0 (0.1≤r1/r2<1). In the following embodiments or other embodiments of the present disclosure, the relative relationship between the first ratio r1 and the second ratio r2 or the relative relationship between the chromaticity differences in the first region R1 and the second region R2 can be obtained by adjusting and changing or designing the structure of the display device 100, and will not be described herein. Furthermore, various embodiments of the present disclosure can be combined and varied with one another, and each structural parameter can be adjusted simultaneously or respectively to achieve the above-mentioned relationship.

Figure 8:
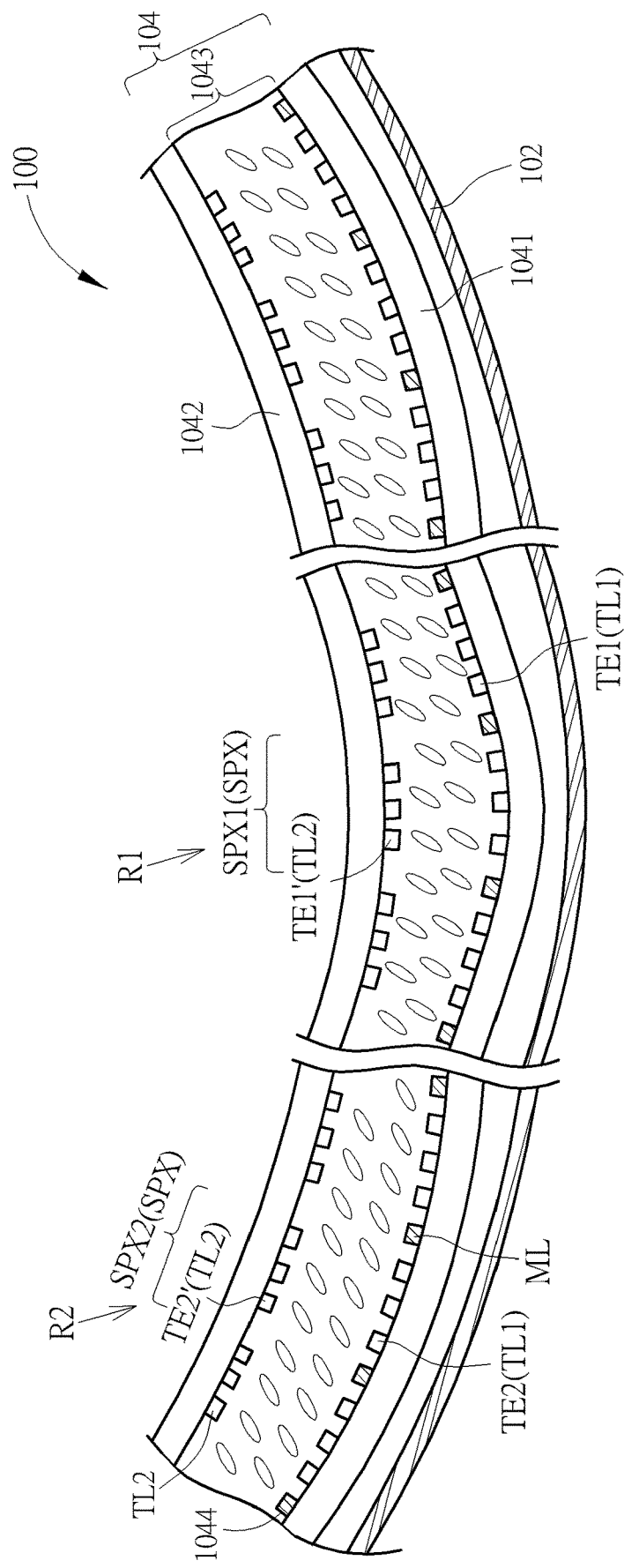
FIG. 8 is a sectional-view schematic diagram of a second embodiment of a display device according to the present disclosure.

Please refer to FIG. 8. FIG. 8 is a sectional-view schematic diagram of another embodiment of a display device according to the present disclosure. FIG. 8 only illustrates a metal conductive layer ML, a first transparent conductive layer TL1 and a second transparent conductive layer TL2, and other layers and elements on the surfaces of the first substrate 1041 and the second substrate 1043 are omitted. In this embodiment, the first transparent conductive layer TL1 is disposed on the inner surface of the first substrate 1041 and include one or more first transparent electrode(s) TE1 corresponding to the first region R1 and one or more first transparent electrode(s) TE2 corresponding to the second region R2. The second transparent conductive layer TL2 is disposed on the inner surface of the second substrate 1042 and include one or more second transparent electrode (s) TE1' corresponding to the first region R1 and one or more second transparent electrode(s) TE2' corresponding to the second region R2. Furthermore, the second transparent electrode TE1' may correspond to the first transparent electrode TE1, and the second transparent electrode TE2' may correspond to the first transparent electrode TE2. Each of the first transparent electrodes TE1 and TE2 and each of the second transparent electrodes TE1' and TE2' may be independently used as a pixel electrode or a common electrode in each of the sub-pixels SPX. By adjusting the voltages of the second transparent electrodes TE1' and TE2' in different regions, the inclined angles (the included angle with respect to the normal direction) of the liquid crystal molecules in the liquid crystal layer 1043 may be changed, thus the function of modulating the light phase of the liquid crystal molecules may be changed, and the light output efficiency of light passing through a functional film (such as a polarizing film) may be affected. For example, if the liquid crystal is a positive polarity liquid crystal, when the voltage is higher, the inclined angles of the liquid crystal molecules are smaller, and the brightness of the exiting light may be smaller. Thus, the brightness in different regions may be adjusted to achieve the objective of making the brightness in the normal view (also referred to as normal brightness) more uniform. For example, when performing brightness measurement to the display panel of the prototype display device 100t that has been bent in the step S104, if the normal brightness of the first region Rt1 is less than the normal brightness of the second region Rt2, then the voltage provided to the second transparent electrode TE2' in the second region R2 can be designed to be slightly greater than the voltage provided to the second transparent electrode TE1' of the first region R1 to increase the inclined angles of the liquid crystal molecules near the second region R2, and reduce the brightness of the second region R2. If the measured result in the step S104 is opposite to the above-mentioned example, then the relationship of the voltages provided to the second transparent electrode TE1' and the second transparent electrode TE2' may be opposite to the above-mentioned example, and will not be described herein. The various embodiments of the present invention can be combined and varied with one another, and each structural parameter can be adjusted simultaneously or respectively to achieve the above-mentioned relationship.

Figure 9:
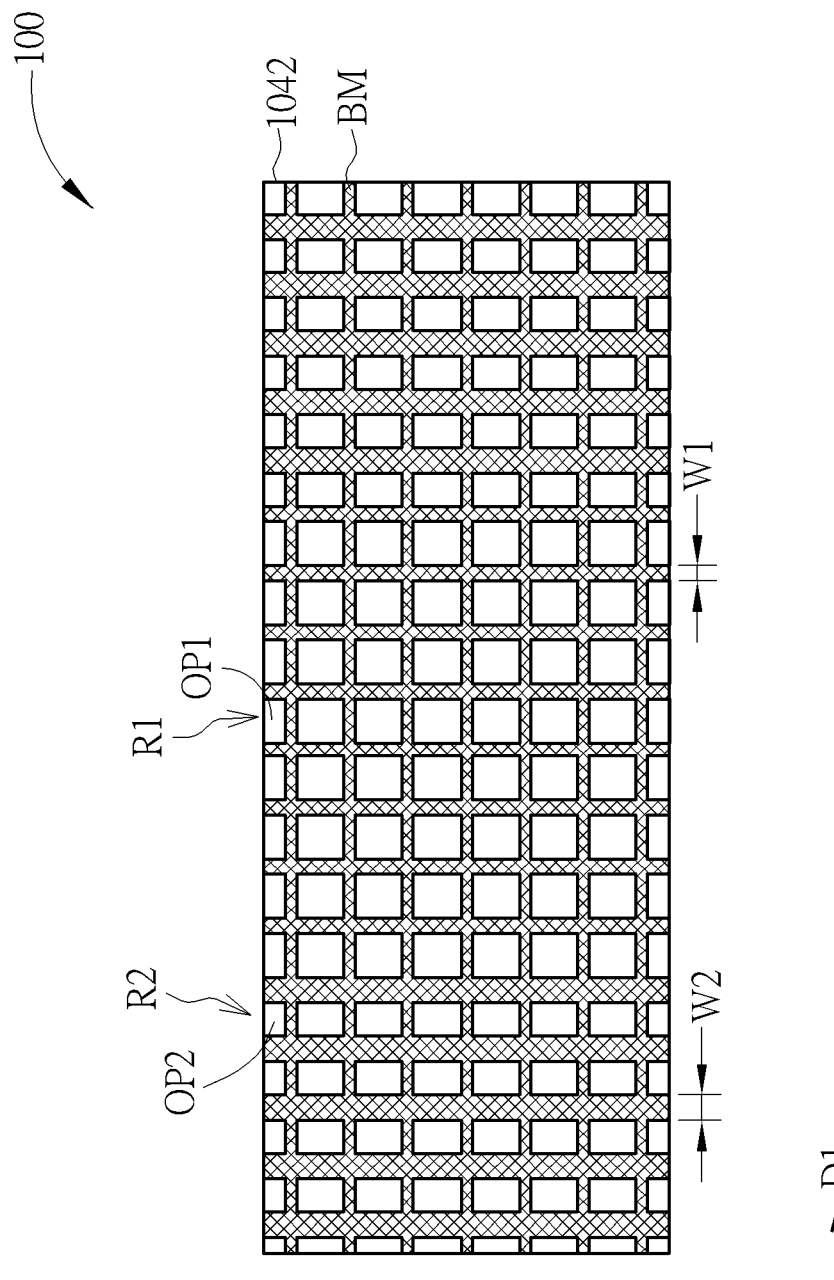
FIG. 9 is a top-view schematic diagram of a third embodiment of a display device according to the present disclosure.

Please refer to FIG. 9. FIG. 9 is a top-view schematic diagram of another embodiment of a display device and only illustrates a light shielding layer BM and a second substrate 1042. The light shielding layer BM has different pixel aperture ratios and/or different pattern widths or pattern sizes in the first region R1 and the second region R2 to adjust the individual light output amount of the sub-pixels in different regions and improve the uniformity of the normal brightness. For example, the aperture ratio OP1 of the first region R1 is made greater than the aperture ratio OP2 of the second region R2, so that the light output amount of the sub-pixels of the first region R1 is larger than the light output amount of the sub-pixels of the second region R2. In the design mentioned above, the width W1 of the patterns in the bending direction (i.e., the direction D1) of the light shielding layer BM in the first region R1 may be smaller than the width W2 of the patterns in the bending direction of the light shielding layer BM in the second region R2, so as to enhance the aperture ratio OP1 of the sub-pixels of the first region R1 or reduce the aperture ratio OP2 of the sub-pixels of the second region R2. In different embodiments, the aperture ratio OP1 and the aperture ratio OP2 may be designed as having relative relationship opposite to the above-mentioned example, and will not be described herein. The various embodiments of the present disclosure can be combined and varied with one another, and each structural parameter can be adjusted simultaneously or respectively to achieve the above-mentioned relationship.

Figure 10:
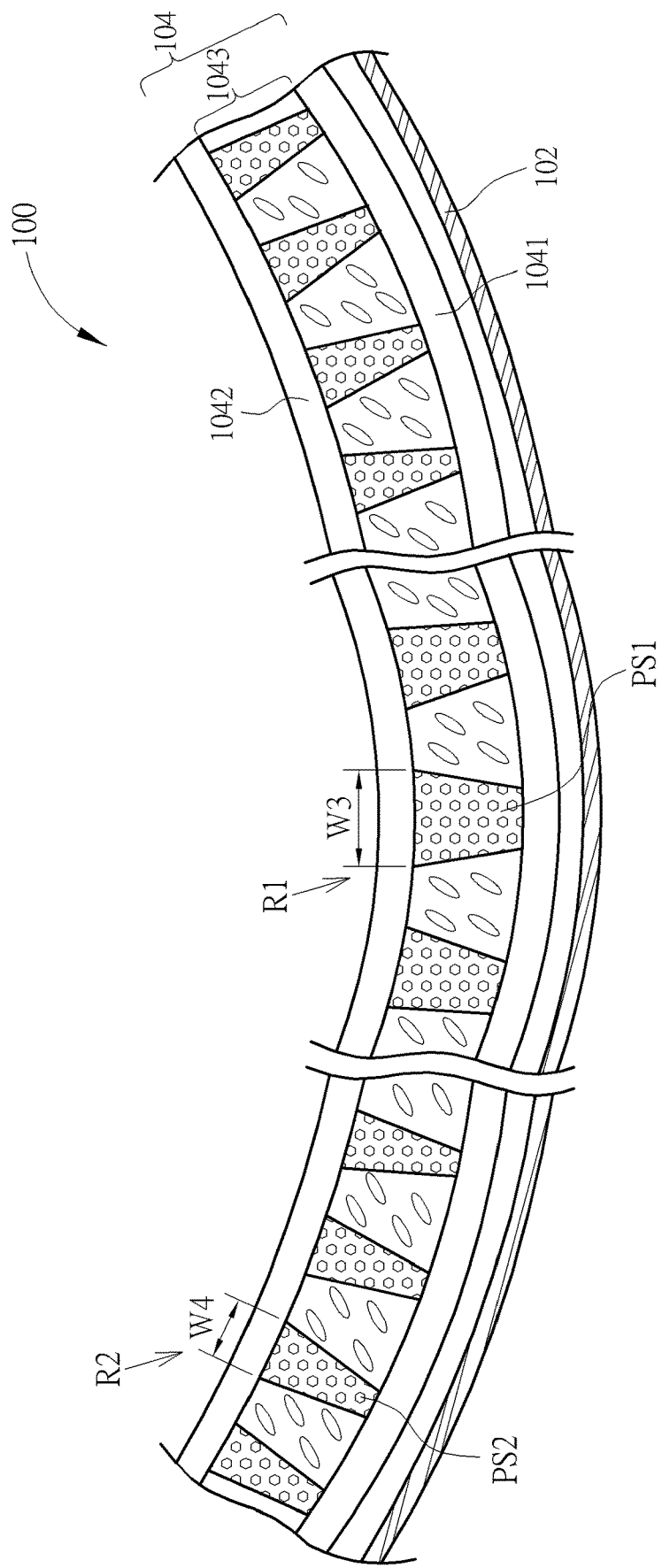
FIG. 10 is a partial sectional-view schematic diagram of a fourth embodiment of a display device according to the present disclosure.

Please refer to FIG. 10. FIG. 10 is a partial sectional-view schematic diagram of another embodiment of a display device and only illustrates a backlight module 102, a first substrate 1041, a second substrate 1042, a liquid crystal layer 1043 and spacers PS1 and PS2 disposed between the first substrate 1041 and the second substrate 1042. The width of the spacers is the maximum width on the partial section mentioned above, such as a width of an upper surface. In FIG. 10, a width W3 of the spacer PS1 in the first region R1 is greater than a width W4 of the spacer PS2 in the second region R2. Therefore, the spacer PS1 may provide stronger supporting force to the liquid crystal layer 1043, and the extent that the partial liquid crystal layer 1043 is compressed due to bending may be reduced, thereby reducing the attenuation of the brightness. Therefore, for increasing the light output amount or brightness of the first region R1, the width W3 of the spacer PS1 in the first region R1 may be made larger, as shown in FIG. 10. In contrast, for reducing the light output amount or brightness of the first region R1, the width W3 of the spacer PS1 in the first region R1 may be made smaller. The various embodiments of the present disclosure can be combined and varied with one another, and each structural parameter can be adjusted simultaneously or respectively to achieve the above-mentioned relationship.

Figure 11:
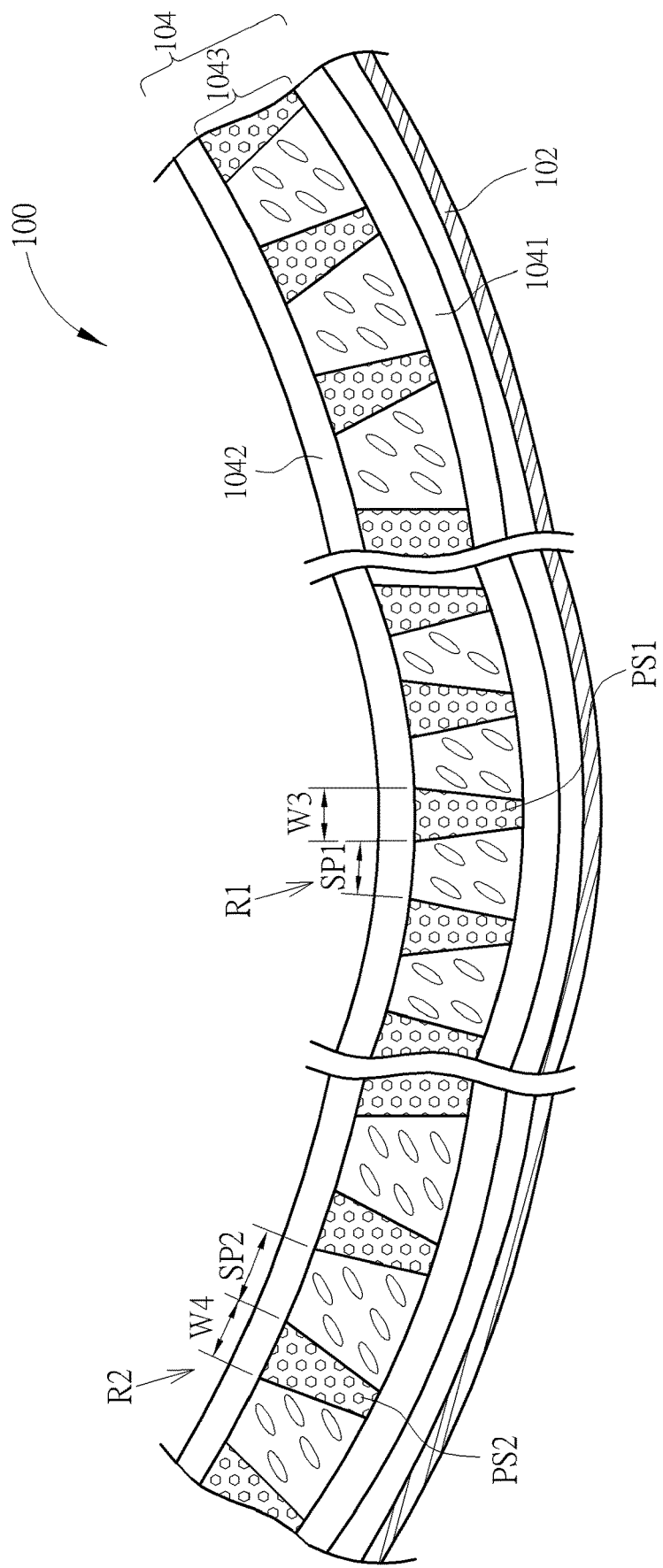
FIG. 11 is a partial sectional-view schematic diagram of a fifth embodiment of a display device according to the present disclosure.

Please refer to FIG. 11. FIG. 11 is a partial sectional-view schematic diagram of another embodiment of a display device and only illustrates a backlight module 102, a first substrate 1041, a second substrate 1042, a liquid crystal layer 1043 and spacers PS1 and PS2 disposed between the first substrate 1041 and the second substrate 1042. As shown in FIG. 11, a width W3 of the spacer PS1 in the first region R1 may be approximately equal to a width W4 of the spacer PS2 in the second region R2, but a distribution density of the spacer PS1 in the first region R1 may be different from a distribution density of the spacer PS2 in the second region R2, that is, a pitch SP1 between the spacers PS1 may be different from a pitch SP2 between the spacers PS2. The distribution density refers to the objective unit per unit area. For example, 400 spacers are distributed in an area of 1 square millimeter ($mm^2$), so the distribution density of the spacer in this portion is 400 (unit/$mm^2$). In FIG. 11, the pitch SP1 is less than the pitch SP2 for example. In such condition, when the distribution density of the spacers PS1 is greater, a better supporting force may be provided, and the extent that the partial liquid crystal layer 1043 is compressed may be reduced, thereby reducing the attenuation of the brightness of the first region R1. In contrast, when the distribution density of the spacers PS2 is smaller, the extent that the partial liquid crystal layer 1043 is compressed may be greater, such that the brightness of the second region R2 is lower. In different embodiments, the distribution density of the spacers PS1 and PS2 may have opposite design. The various embodiments of the present disclosure can be combined and varied with one another, and each structural parameter can be adjusted simultaneously or respectively to achieve the above-mentioned relationship.

Figure 12:
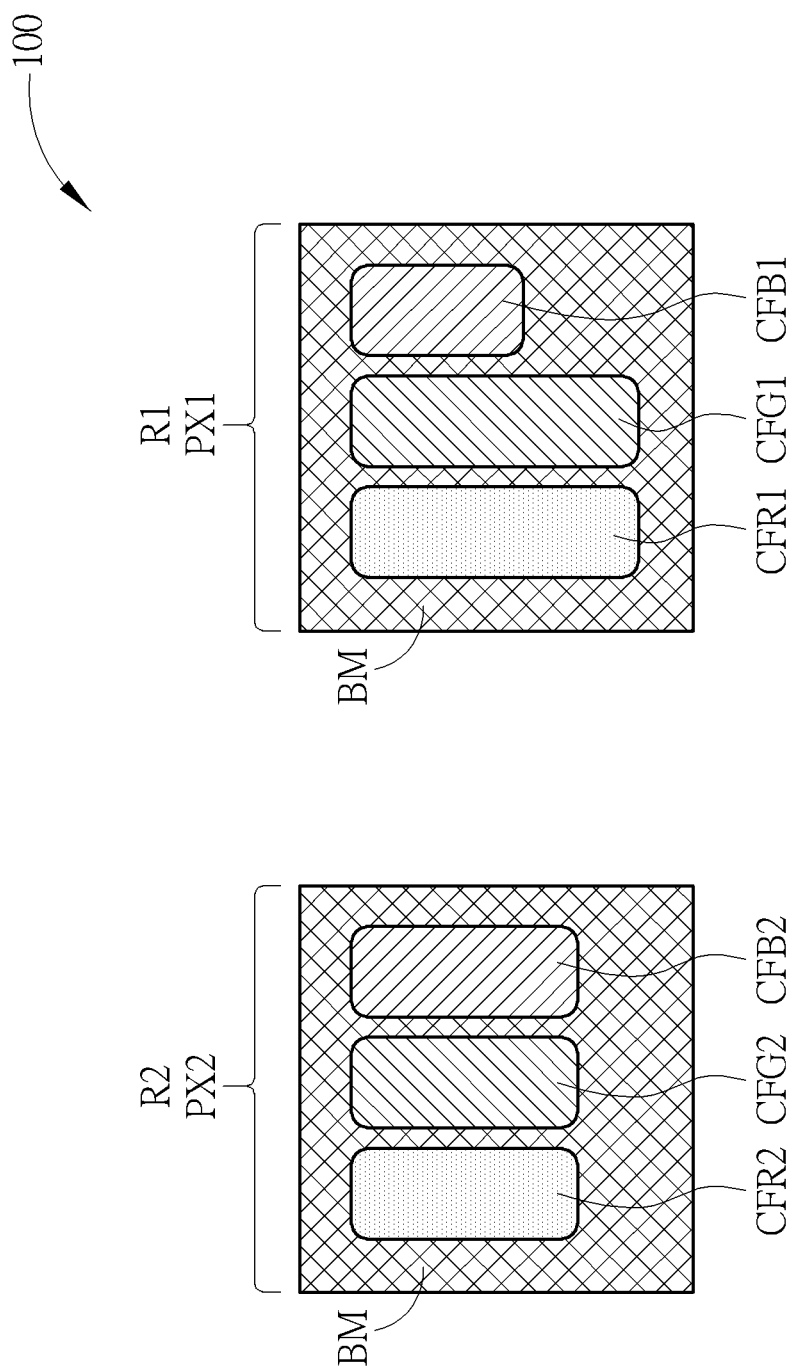
FIG. 12 is a partial enlargement schematic diagram of a sixth embodiment of a display device according to the present disclosure.

Please refer to FIG. 12. FIG. 12 is a partial enlargement schematic diagram of another embodiment of a display device and illustrates the arrangement of the color filter layer of a pixel PX1 in the first region R1 and a pixel PX2 in the second region R2. The pixels generally include a red sub-pixel, a green sub-pixel and a blue sub-pixel, but not limited thereto. In FIG. 12, the red filter CFR2, the green filter CFG2 and the blue filter CFB2 in the single pixel PX2 of the second region R2 all have the same areas, and the areas of the red filter CFR1, the green filter CFG1 and the blue filter CFB1 in the single pixel PX1 of the first region R1 are different. For example, the area of the blue filter CFB1 is less than the area of the red filter CFR1, and the area of the blue filter CFB1 is less than the area of the green filter CFG1. Furthermore, the area of the red filter CFR1 is greater than the area of the red filter CFR2, and the area of the green filter CFG1 is greater than the area of the green filter CFG2, but not limited thereto. Since the wavelength of the blue light is shorter, the blue light is easier to scatter than the red light and the green light, so the relatively smaller area of the blue filter CFB1 in the pixel PX1 may reduce the proportion of the blue light. Furthermore, since the brightness of the pixel PX1 is less than the brightness of the pixel PX2, the brightness of the red light and the green light may be increased, so as to reduce the absolute value of the brightness difference in the normal view angle and improve the perception of human eyes to the normal brightness of the pixel PX1. Therefore, the perception of human eyes about the normal brightness of the pixel PX1 and the pixel PX2 may be different due to the different structural designs of the pixel PX1 and the pixel PX2 in FIG. 12, thereby adjusting the uniformity of the normal brightness in the first region R1 and the second region R2 according to the curvatures of each region. In different embodiments, the arrangement of the areas of the color filters of the pixel PX1 and the pixel PX2 may be exchanged, and the arrangement of the color filters of each color is not limited to that shown in FIG. 12. The various embodiments of the present disclosure can be combined and varied with one another, and each structural parameter can be adjusted simultaneously or respectively to achieve the above-mentioned relationship.

Figure 13:
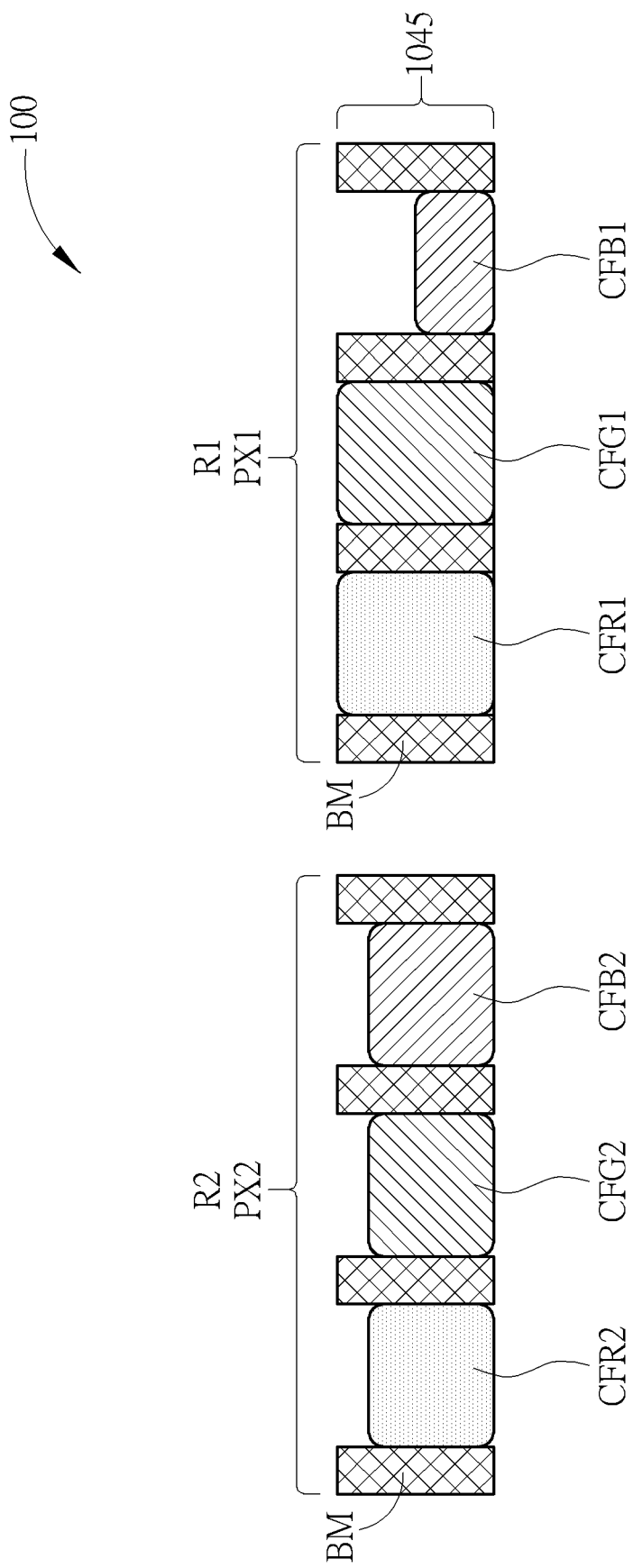
FIG. 13 is a sectional-view enlargement schematic diagram of a partial color filter layer of a seventh embodiment of a display device according to the present disclosure.

Please refer to FIG. 13. FIG. 13 is a sectional-view enlargement schematic diagram of a partial color filter layer of another embodiment of a display device. The color filter layer 1045 of the display device 100 may have different thicknesses in the first region R1 and the second region R2. In FIG. 13, the red filter CFR2, the green filter CFG2 and the blue filter CFB2 in the pixel PX2 of the second region R2 may have the same thickness, and the thicknesses of the red filter CFR1, the green filter CFG1 and the blue filter CFB1 in the pixel PX1 of the first region R1 may be different. For example, the thickness of the blue filter CFB1 is less than the thickness of the red filter CFR1, and the thickness of the blue filter CFB1 is less than the thickness of the green filter CFG1. Furthermore, the thickness of the green filter CFG1 in the pixel PX1 is greater than the thickness of the green filter CFG2 in the pixel PX2, and the thickness of the red filter CFR1 in the pixel PX1 is greater than the thickness of the red filter CFR2 in the pixel PX2, but not limited thereto. In such design, the thickness of the blue filter CFB1 in the pixel PX1 is relatively less than the thicknesses of the red filter CFR1 and the green filter CFG1 in pixel PX1, so the proportion of the blue light that is easier to scatter may be reduced. Furthermore, since the brightness of the pixel PX1 is less than the brightness of the pixel PX2, the brightness of the red light and the green light may be increased, so as to reduce the absolute value of the brightness difference in the normal view angle and improve the perception of human eyes to the normal brightness of the pixel PX1. In different embodiments, the thickness design of the color filter layer 1045 in the pixel PX1 and the pixel PX2 may be exchanged, or there may be other thickness variants according to the requirements. The various embodiments of the present disclosure can be combined and varied with one another, and each structural parameter can be adjusted simultaneously or respectively to achieve the above-mentioned relationship.

Figure 14:
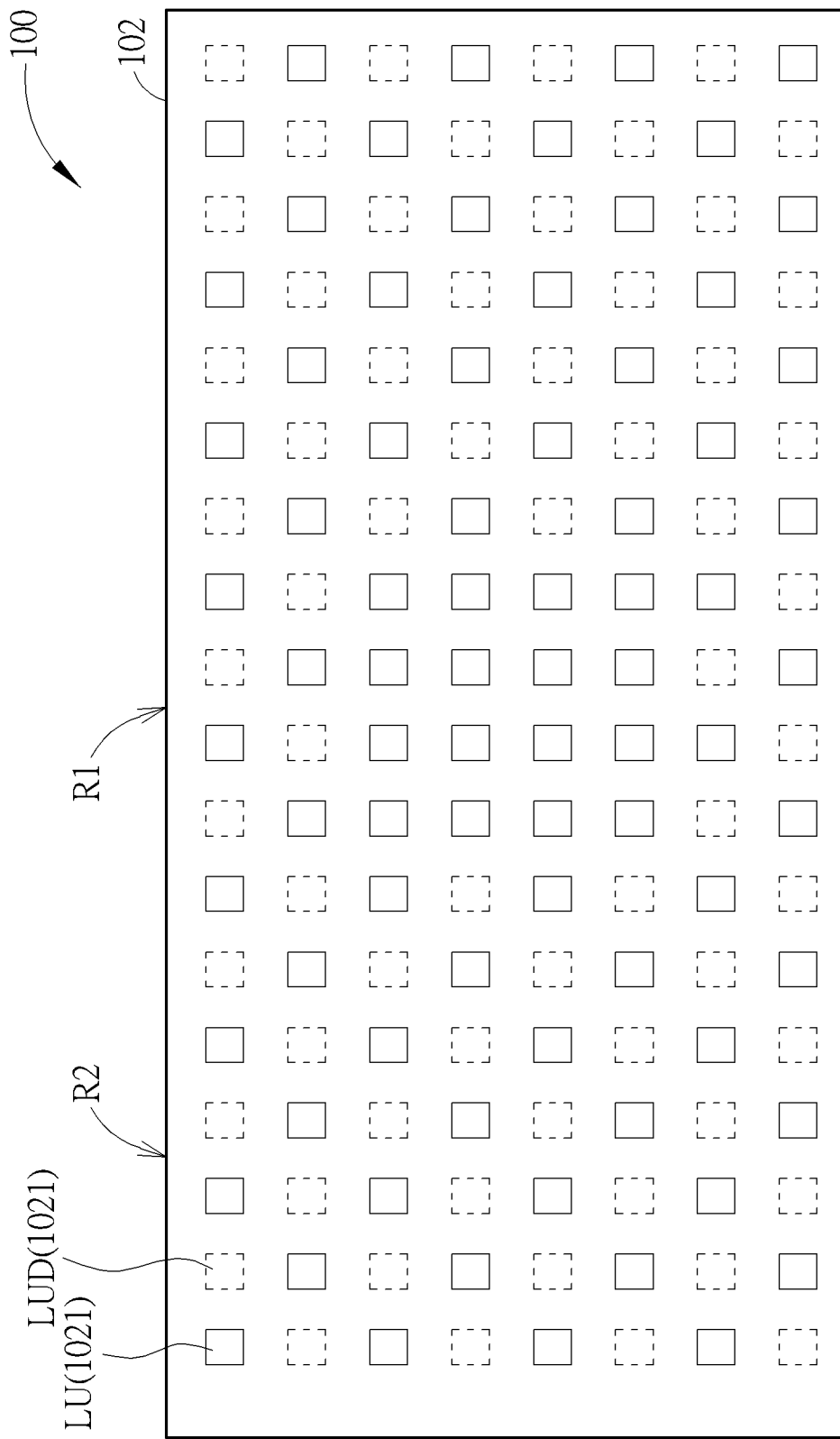
FIG. 14 is a top-view enlargement schematic diagram of a backlight module of an eighth embodiment of a display device according to the present disclosure.

Please refer to FIG. 14. FIG. 14 is a top-view enlargement schematic diagram of a backlight module of another embodiment of a display device and only illustrates light emitting elements 1021 in a backlight module 102. As shown in FIG. 14, the backlight module 102 may include a plurality of light emitting elements 1021 arranged side by side in a light emitting unit array along the direction D1 and the direction D2. However, this embodiment may be designed as that not all of the light emitting elements 1021 will be lit up when the display device 100 is in an operating state. As shown in FIG. 14, the light emitting elements 1021 that will be lit up when the display device 100 is operated are defined as light emitting units LU, which can actually provide backlight sources. In addition, some light emitting elements 1021 may not be lit up when the display device 100 is operated, which can be used as dummy light emitting units LUD. Thus, the brightness of partial regions of the backlight module 102 may be adjusted, thereby adjusting the brightness uniformity of the display device 100. For example, in FIG. 14, the distribution density of the light emitting units LU corresponding to the first region R1 may be greater than the distribution density of the light emitting units LU corresponding to the second region R2, and the number of the dummy light emitting units LUD corresponding to the second region R2 may be greater than the number of the dummy light emitting units LUD corresponding to the first region R1. Therefore, the backlight module 102 may provide higher brightness to the first region R1 of the display panel 104. If the normal brightness in the first region Rt1 obtained during the measurement in the step S104 of FIG. 4 is smaller, the design of the backlight module 102 of FIG. 14 may be adopted. If the normal brightness in the second region Rt2 obtained during the measurement in the step S104 of FIG. 4 is smaller, the backlight module 102 may be designed to have a larger number of light emitting units LU corresponding to the second region R2 and a larger number of dummy light emitting units LUD corresponding to the first region R1, and will not be described herein. The various embodiments of the present disclosure can be combined and varied with one another, and each structural parameter can be adjusted simultaneously or respectively to achieve the above-mentioned relationship.

Figure 15:
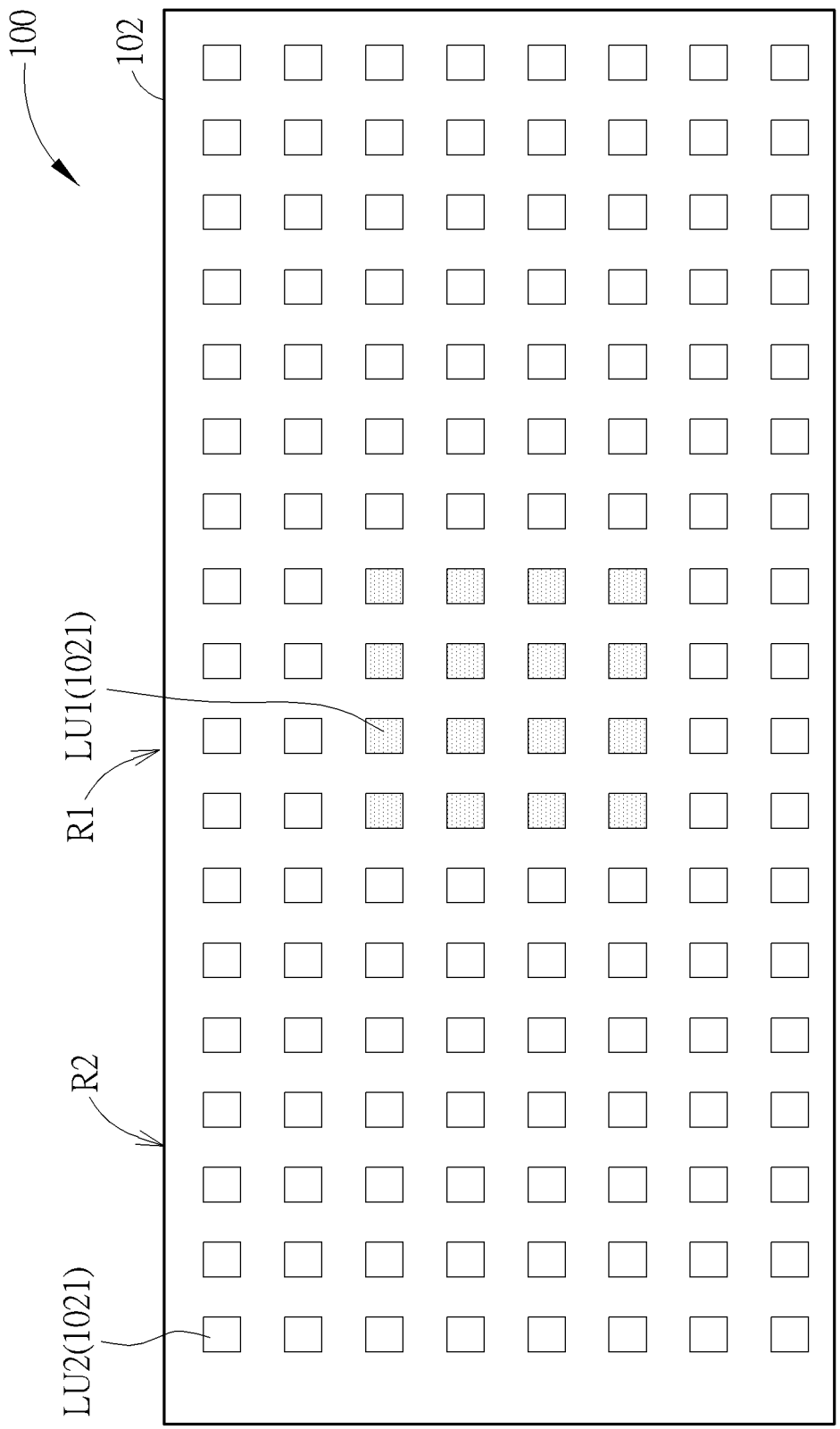
FIG. 15 is a top-view enlargement schematic diagram of a backlight module of a ninth embodiment of a display device according to the present disclosure.

Please refer to FIG. 15. FIG. 15 is a top-view enlargement schematic diagram of a backlight module of another embodiment of a display device and only illustrates light emitting elements 1021 in a backlight module 102. The backlight module 102 in this embodiment may include a plurality of light emitting elements 1021 arranged in an array, but the light emitting elements 1021 may provide different light emitting brightness depending on the arrangement positions, that is, the backlight module 102 has a design with stronger brightness in partial position. For example, in the first region R1, some of the light emitting elements 1021 may be referred to as first light emitting units LU1, the other light emitting elements 1021 may be referred to as second light emitting units LU2, and the first light emitting units LU1 may provide stronger brightness than the second light emitting units LU2. For example, the brightness of the first light emitting units LU1 may be stronger by providing larger voltage or current to the first light emitting units LU1, but not limited thereto. If the normal brightness in the first region Rt1 obtained during the measurement in the step S104 of FIG. 4 is smaller, the design of the backlight module 102 of FIG. 15 may be adopted. If the normal brightness in the second region Rt2 obtained during the measurement in the step S104 of FIG. 4 is smaller, the backlight module 102 may be designed to have a larger number of first light emitting units LU1 corresponding to the second region R2, and will not be described herein. In another embodiment, the light emitting element 1021 may provide more than three kinds of brightness according to requirements to provide different brightness for different regions of the display panel 104. The various embodiments of the present disclosure can be combined and varied with one another, and each structural parameter can be adjusted simultaneously or respectively to achieve the above-mentioned relationship.

Figure 16:
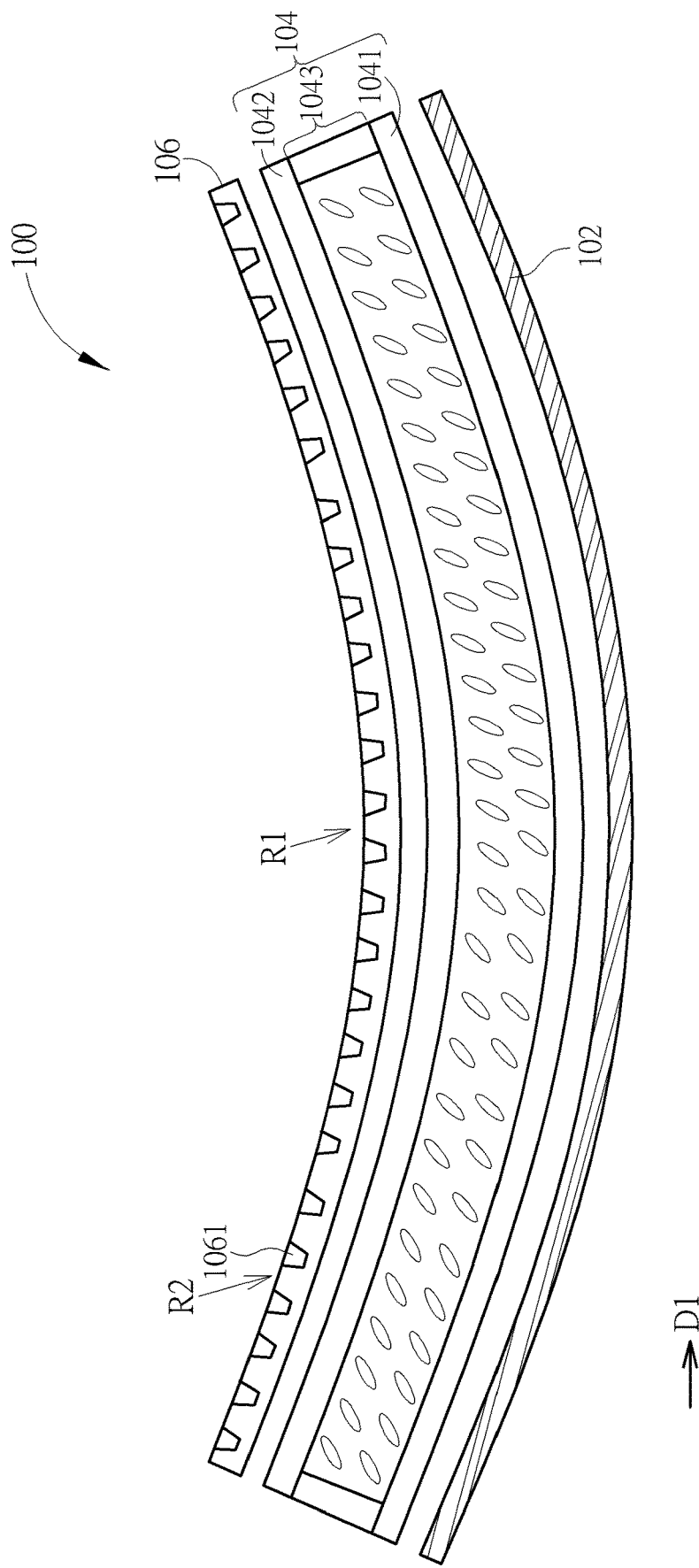
FIG. 16 is a partial sectional-view schematic diagram of a tenth embodiment of a display device according to the present disclosure.
Figure 17:
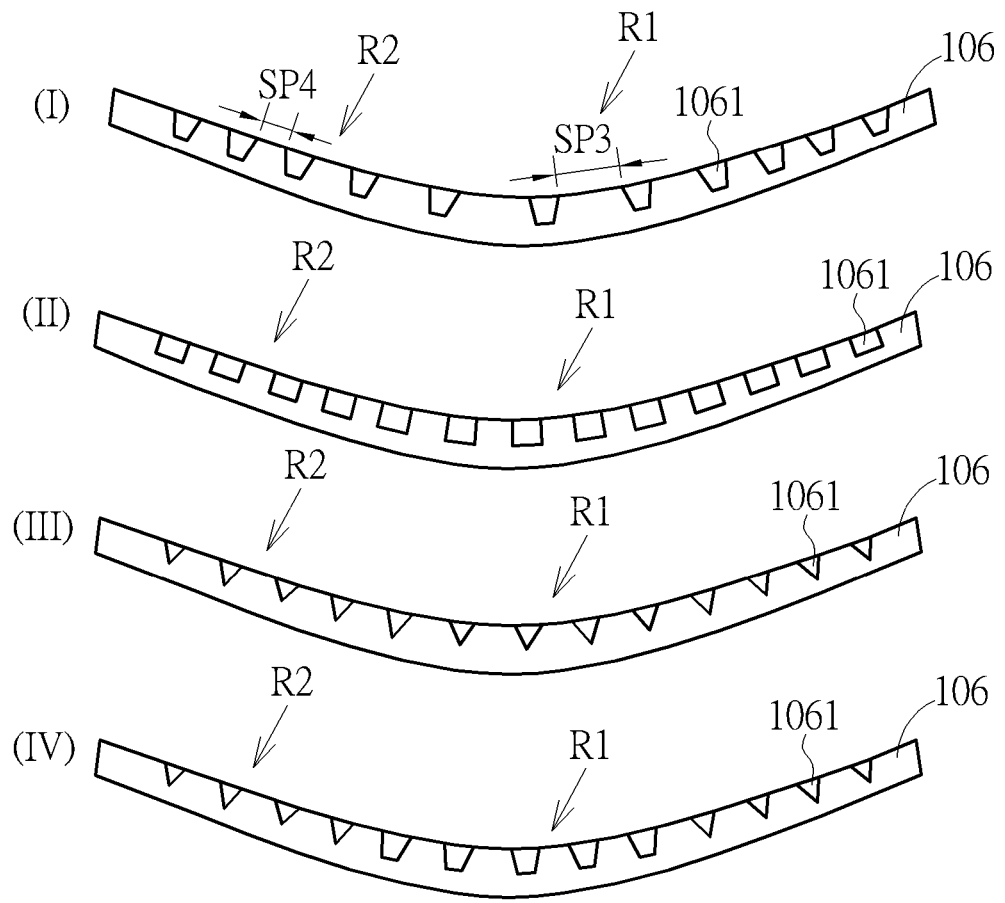
FIG. 17 is a sectional-view schematic diagram of other examples of an optical compensation film according to the present disclosure.

Please refer to FIG. 16. FIG. 16 is a partial sectional-view schematic diagram of another embodiment of a display device. Besides the backlight module 102 and the display panel 104, the display device 100 in FIG. 16 may also include an optical compensation film 106 disposed on the light output side of the display panel 104, which is the outer surface of the second substrate 1042. The optical compensation film 106 may include a plurality of grooves 1061 on the surface. The partial light output intensity of the display panel 104 may be adjusted by the distribution density, the patterns or the shapes of the grooves 1061, so as to achieve the effect of making the normal brightness more uniform. The cross-sectional shapes of the grooves 1061 in FIG. 16 are trapezoids as an example, but not limited thereto. For example, the cross-sectional shapes of the grooves 1061 may be rectangles, triangles or any other suitable shapes. In addition, the grooves 1061 may have different designs in the first region R1 and the second region R2 according to the requirements to partially adjust the light output amount and the light brightness in the normal angle in each region. Please refer to FIG. 17. FIG. 17 is a sectional-view schematic diagram of other examples of an optical compensation film. As shown in an example (I) in FIG. 17, the grooves 1061 may respectively have different pitches SP3 and pitches SP4 in the first region R1 and the second region R2. As shown in an example (II) in FIG. 17, the grooves 1061 may have rectangular cross-sectional shapes. As shown in an example (III) in FIG. 17, the grooves 1061 may have triangular cross-sectional shapes. As shown in an example (IV) in FIG. 17, the grooves 1061 may respectively have different cross-sectional shapes in the first region R1 and the second region R2. For example, the grooves 1061 in the first region R1 have trapezoidal cross-sectional shapes, and the grooves 1061 in the second region R2 have triangular cross-sectional shapes, but not limited thereto. The various shapes of the grooves 1061 may be combined or adjusted and varied according to requirements, and the grooves 1061 may be filled with air or any filling material, only if the refractive index of the grooves 1061 is different from the refractive index of the optical compensation film 106, the effect of adjusting the light output angle can be achieved. The various embodiments of the present disclosure can be combined and varied with one another, and each structural parameter can be adjusted simultaneously or respectively to achieve the above-mentioned relationship.

Figure 18:
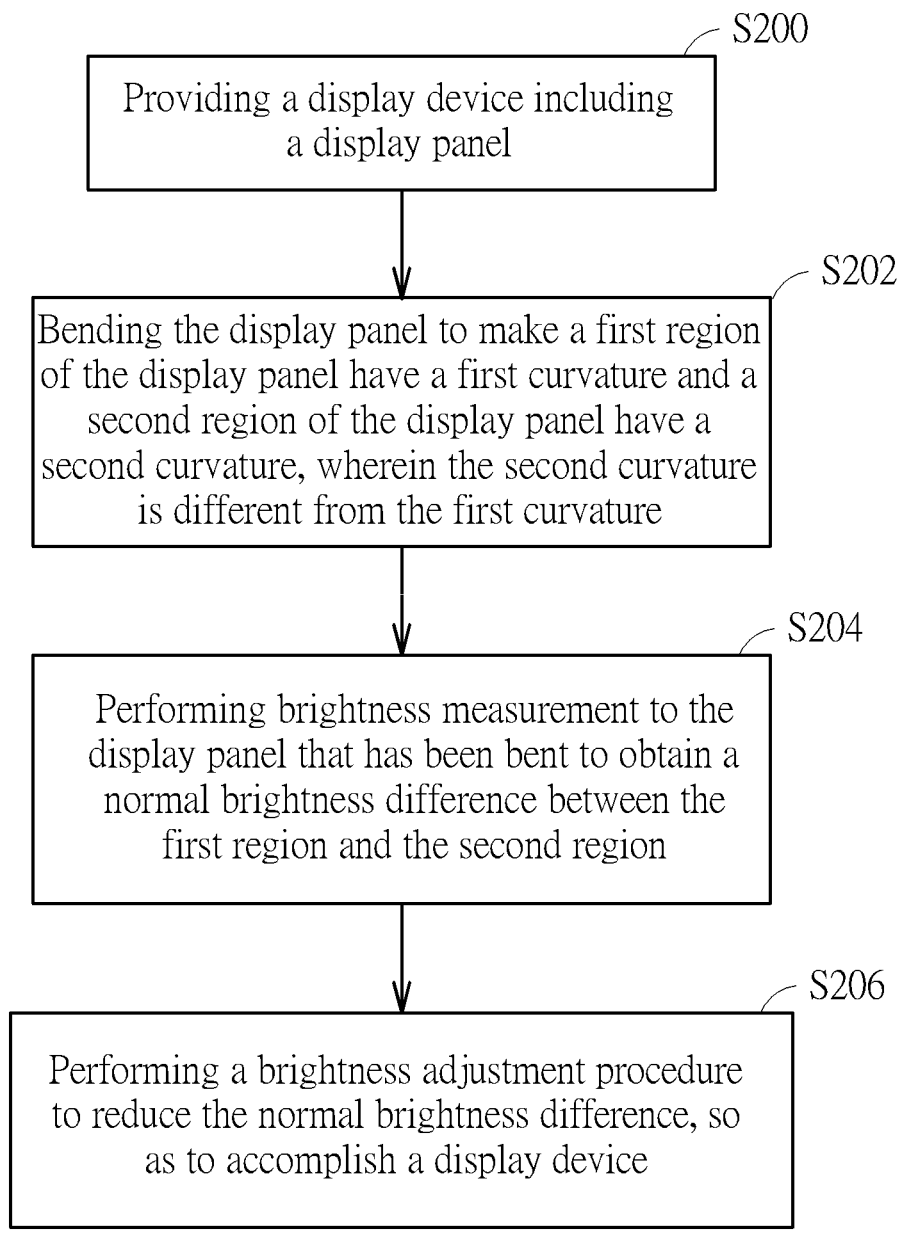
FIG. 18 is a flowchart of a second embodiment of a manufacturing method of a display device according to the present disclosure.
Figure 19:
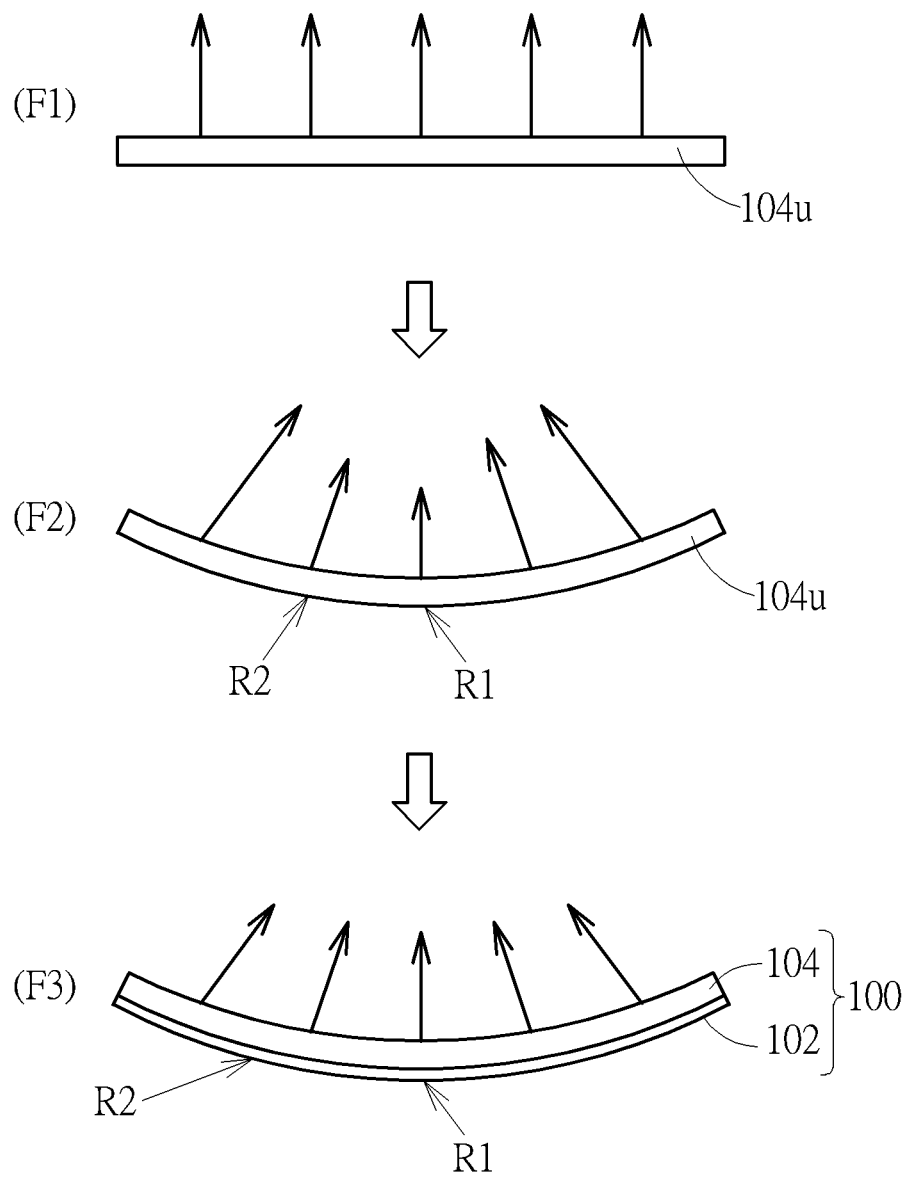
FIG. 19 is a manufacturing process schematic diagram of the method shown in FIG. 18.

Please refer to FIG. 18 and FIG. 19. FIG. 18 is a flowchart of another embodiment of a manufacturing method of a display device. FIG. 19 is a manufacturing process schematic diagram of the method shown in FIG. 18. The manufacturing method of the display device includes the following steps:

Step S200: Providing a display device including a display panel. The structure of the display device may be similar to the liquid crystal device as shown in FIG. 1, and besides the display device may also be other types of display devices. In an initial state, the display panel 104*u* of the display device has a display surface of a plate shape, and each region on the display panel 104*u* has an exiting light type that is substantially uniform, as shown in a flow (F1) of FIG. 19.

Step S202: Bending the display panel 104*u* to make a first region R1 of the display panel 104*u* have a first curvature and a second region R2 of the display panel 104*u* have a second curvature. The second curvature is different from the first curvature. When the display panel 104*u* is in a bent state, since the curvatures of different regions of the display panel 104*u* are different, the incident light from the backlight module can have different light paths in the liquid crystal layer, or the emitting directions of the light emitting sources of the display panel itself may be different. Thus, the display panel can have different exiting light types in different regions, and the light can have different brightness or chromaticity in different angle as shown in a flow (F2) of FIG. 19.

Step S204: Performing brightness measurement in each angle to the display panel that has been bent to obtain an absolute value of a normal brightness difference between the first region R1 and the second region R2.

Step S206: Performing a brightness adjustment procedure to reduce the absolute value of the normal brightness difference between the first region R1 and the second region R2 of the display panel 104*u*, so as to accomplish a display device with more uniform normal brightness, such as the display device 100 as shown in a flow (F3) of FIG. 19. In the brightness adjustment procedure of the step S206, the structural parameters for adjusting normal brightness uniformity include, for example, the adjustment of the partial brightness of backlight source (such as the method of FIG. 15 to FIG. 17) and the design of the optical compensation film, but not limited thereto.

When performing measurement to the brightness (or chromaticity) of the bent display device in the step S204, it is mainly to perform measurement to the brightness (or chromaticity) of the exiting light in the direction of the normal view angle in different regions, and it may be selectively to perform measurement to the brightness (or chromaticity) of the exiting light in the direction of the oblique view angle to realize the brightness difference in different regions in the direction of the normal view angle and the brightness difference in different regions in the direction of the oblique view angle. In the brightness adjustment procedure, the principle is mainly to reduce the normal brightness difference between different regions, and the oblique brightness difference may also be selectively reduced. If it may not be both achieved, the objective is to reduce the normal brightness difference between different regions first. In this objective, after adjusting the brightness, in order to reduce the normal brightness difference, the adjusted brightness difference ratio in the oblique view angle may be increased, reduced or of not so much difference.

In addition, according to the present disclosure, when in the step S200, the display device may also, according to the later predetermined bent shape, be designed differently for different regions by using one or more other structural parameters in advance, so as to perform pre-compensation design inside the display device. For example, by the design that in different regions, there are different liquid crystal layer thicknesses, angles of electrodes of sub-pixels, pattern design and aperture ratio of the light shielding layer, distribution density and sizes of the spacers, aperture ratio of each color sub-pixel and thickness of color filters of different colors. Thus, the traveling path lengths of the light in the liquid crystal layer are more uniform after bending, but not limited thereto.

From the above description, the display device manufactured by the manufacturing method of the display device according to the present disclosure may have a display surface with a curved surface. In each region with different curvatures, the normal brightness difference ratio in the direction of the normal view angle is smaller, for example, smaller than the oblique brightness difference ratio in the direction of the oblique view angle. Thus, users in the direction of the normal view angle may obtain images with more uniform brightness. When the display device of the present disclosure is applied to the condition that less number of users or the user is directly in front of the display device, for example, applied to a vehicle display device, the position of the main user (such as the driver in the vehicle display device) is fixed, so the optimized design in the specific view angle may be performed for the users, for example, enabling the user right in front of the display device may observe better images.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. An electronic device, comprising:
a display panel comprising a display surface, the display surface comprising a first region and a second region arranged along a first direction, and the display panel outputting a first light in the first region and outputting a second light in the second region,
wherein the first light has a first normal brightness in a first orthogonal direction perpendicular to the first direction and a first oblique brightness in a first inclined direction, and the first orthogonal direction and the first inclined direction form a first acute included angle;
wherein the second light has a second normal brightness in a second orthogonal direction and a second oblique brightness in a second inclined direction, and the second orthogonal direction and the second inclined direction form a second acute included angle; and
wherein the first oblique brightness and the second oblique brightness are different.

2. The electronic device according to claim 1, wherein the first normal brightness and the second normal brightness are different.

3. The electronic device according to claim 2, wherein a ratio of a difference between the first normal brightness and the second normal brightness to the first normal brightness is defined as a first ratio, a ratio of a difference between the first oblique brightness and the second oblique brightness to the first oblique brightness is defined as a second ratio, and the first ratio is less than the second ratio.

4. The electronic device according to claim 3, wherein a ratio of the first ratio to the second ratio is greater than or equal to 0.1 and less than 1.0.

5. The electronic device according to claim 1, wherein the display panel is capable of being curved.

6. The electronic device according to claim 5, wherein when the display panel is curved, a first curvature in the first region is different from a second curvature in the second region.

7. The electronic device according to claim 1, wherein the first light has a first normal chromaticity in the first orthogonal direction and a first oblique chromaticity in the first inclined direction, the second light has a second normal chromaticity in the second orthogonal direction and a second oblique chromaticity in the second inclined direction, and the first oblique chromaticity is different from the second oblique chromaticity.

8. The electronic device according to claim 7, wherein an absolute value of a difference between the first normal chromaticity and the second normal chromaticity is less than an absolute value of a difference between the first oblique chromaticity and the second oblique chromaticity.

9. The electronic device according to claim 1, wherein a pixel in the first region comprises a first sub-pixel and a second sub-pixel, the first sub-pixel and the second sub-pixel have different colors, and the first sub-pixel and the second sub-pixel have different areas.

* * * * *